Figure 1:
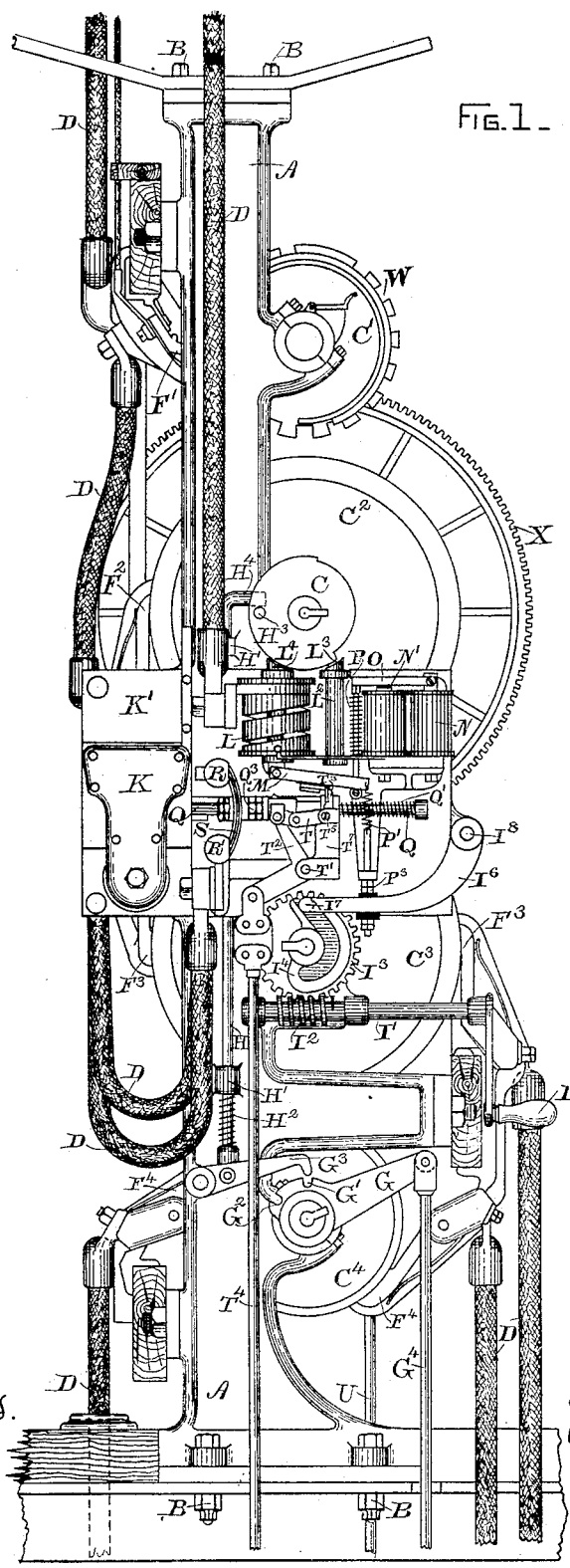

(No Model.) 14 Sheets—Sheet 1.

J. W. DARLEY, Jr.
CONTROLLER FOR ELECTRIC LOCOMOTIVES.

No. 530,507. Patented Dec. 11, 1894.

WITNESSES
Alec F. Macdonald.
S. J. Johnston.

INVENTOR
John W. Darley, Jr.
by Bentley and Blodgett
attys.

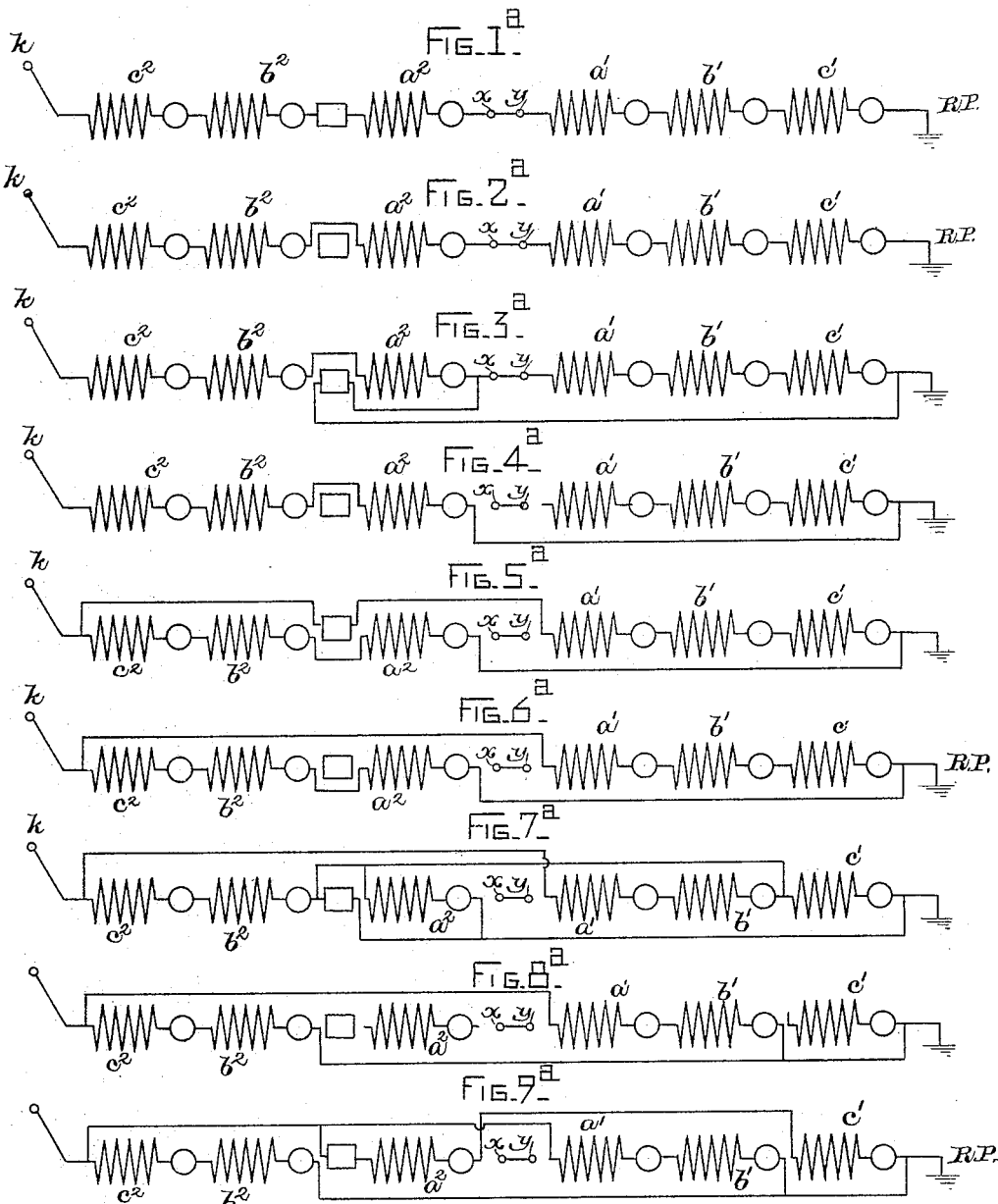

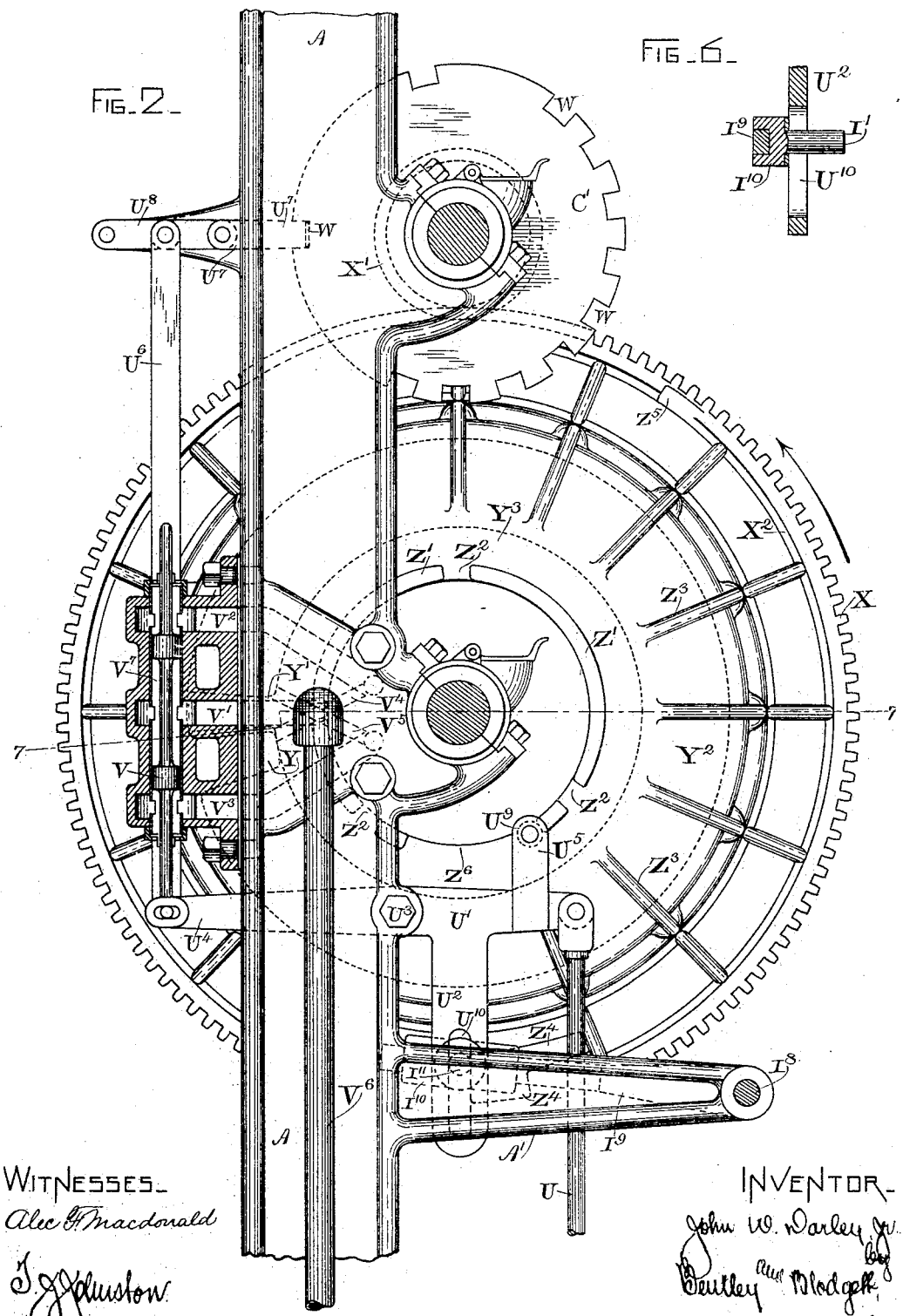

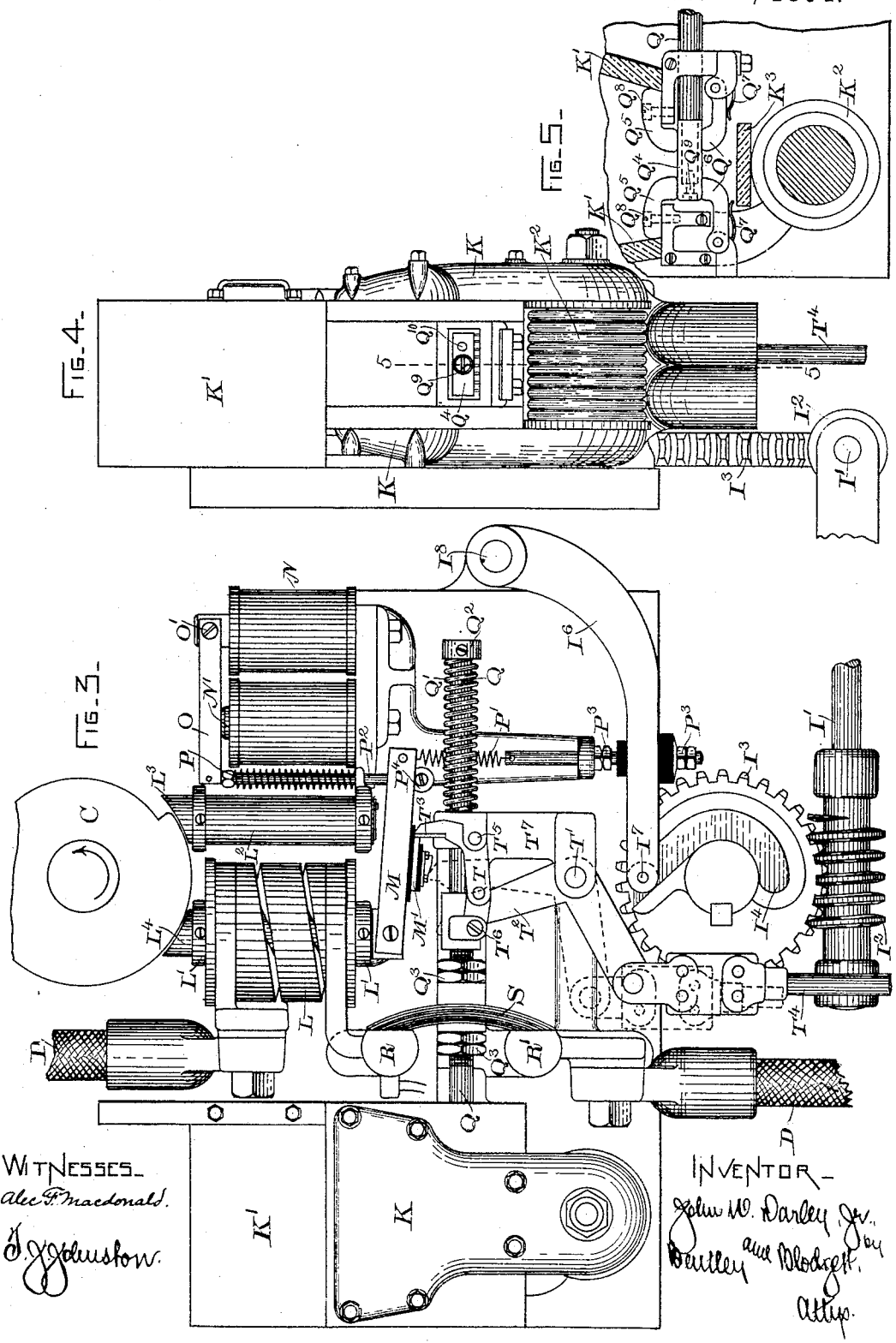

(No Model.) 14 Sheets—Sheet 5.

J. W. DARLEY, Jr.
CONTROLLER FOR ELECTRIC LOCOMOTIVES.

No. 530,507. Patented Dec. 11, 1894.

Witnesses:
Alec F. Macdonald
T. J. Johnston

Inventor:
John W. Darley, Jr.
Darley and Blodgett
Attys.

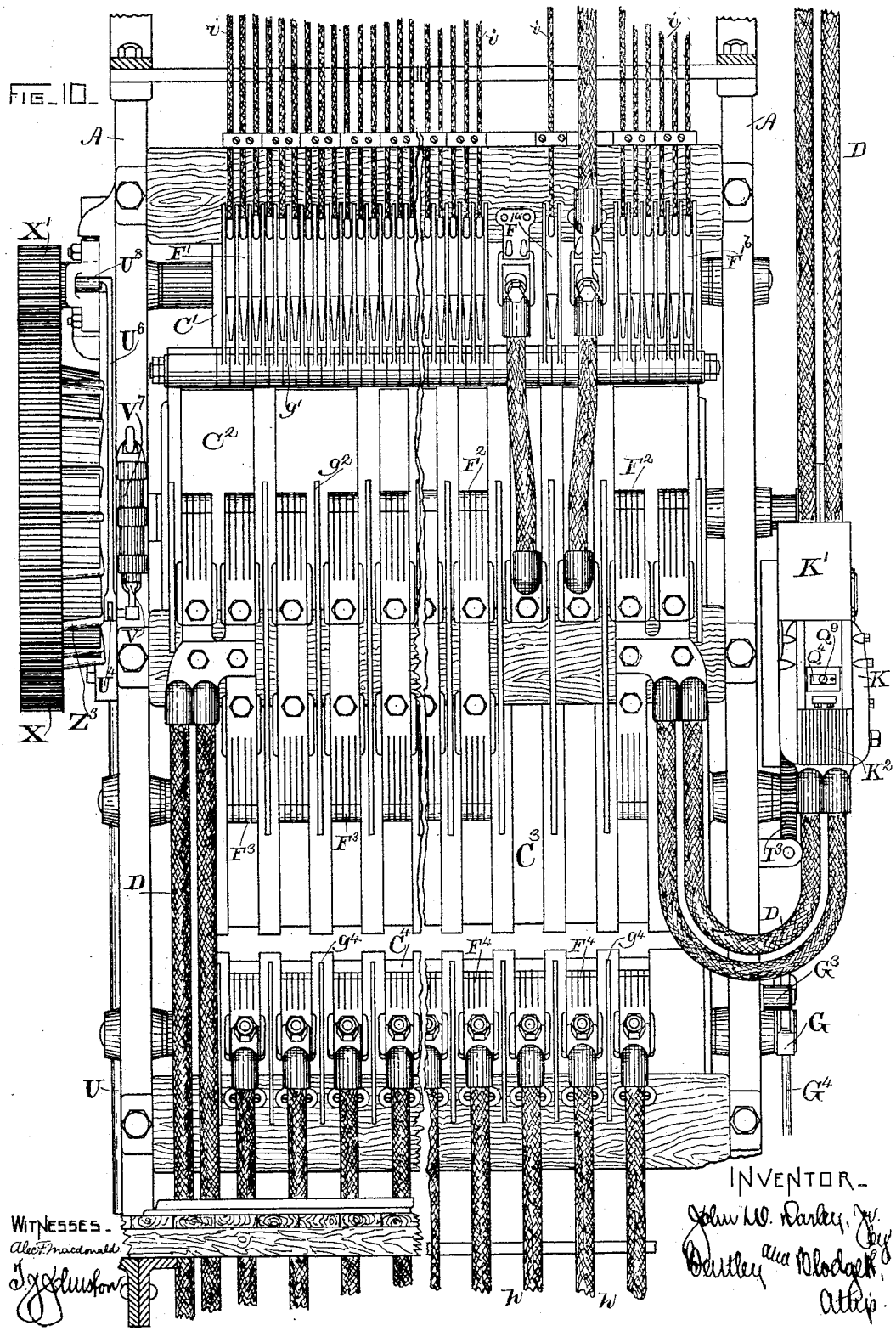

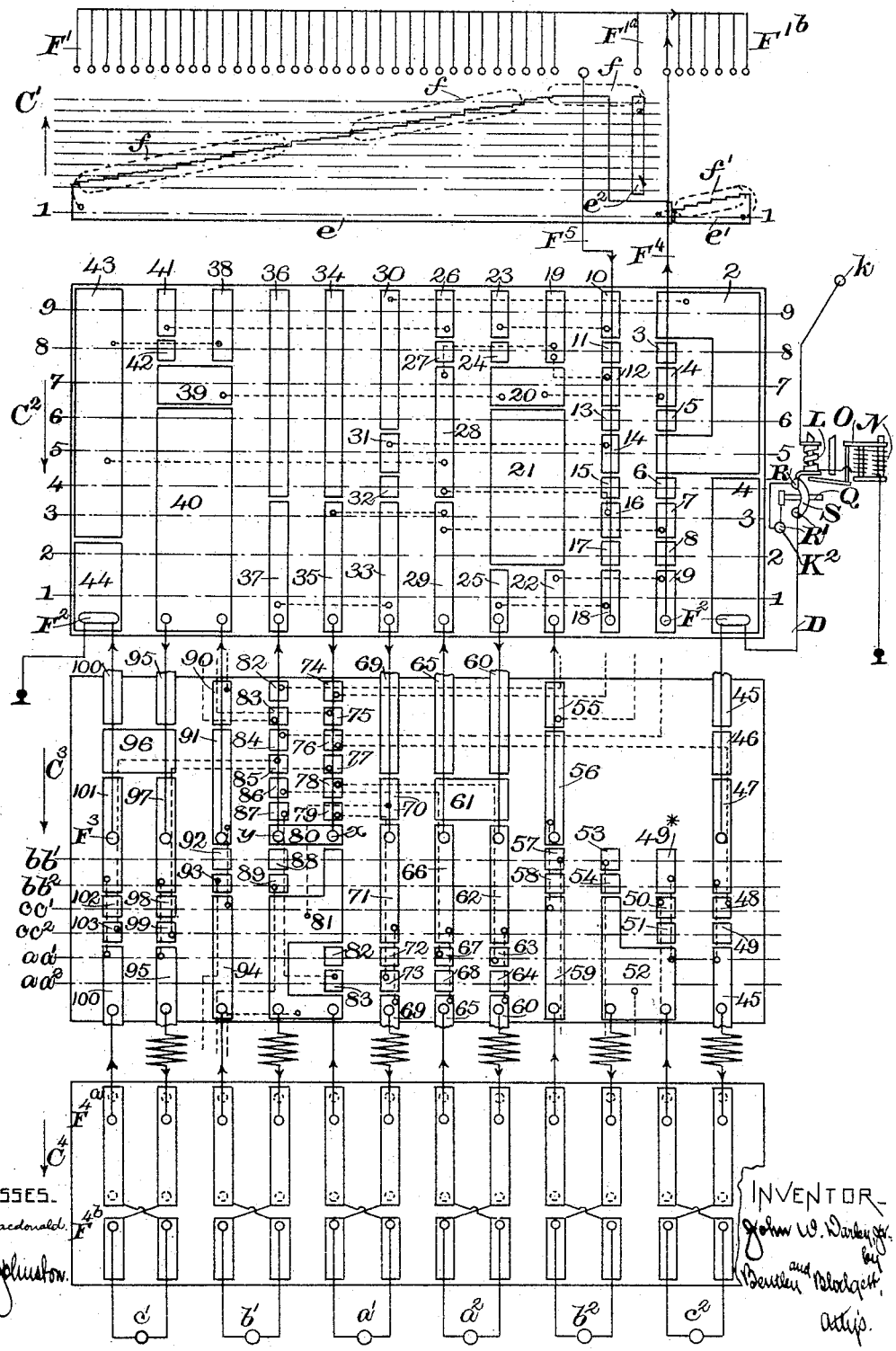

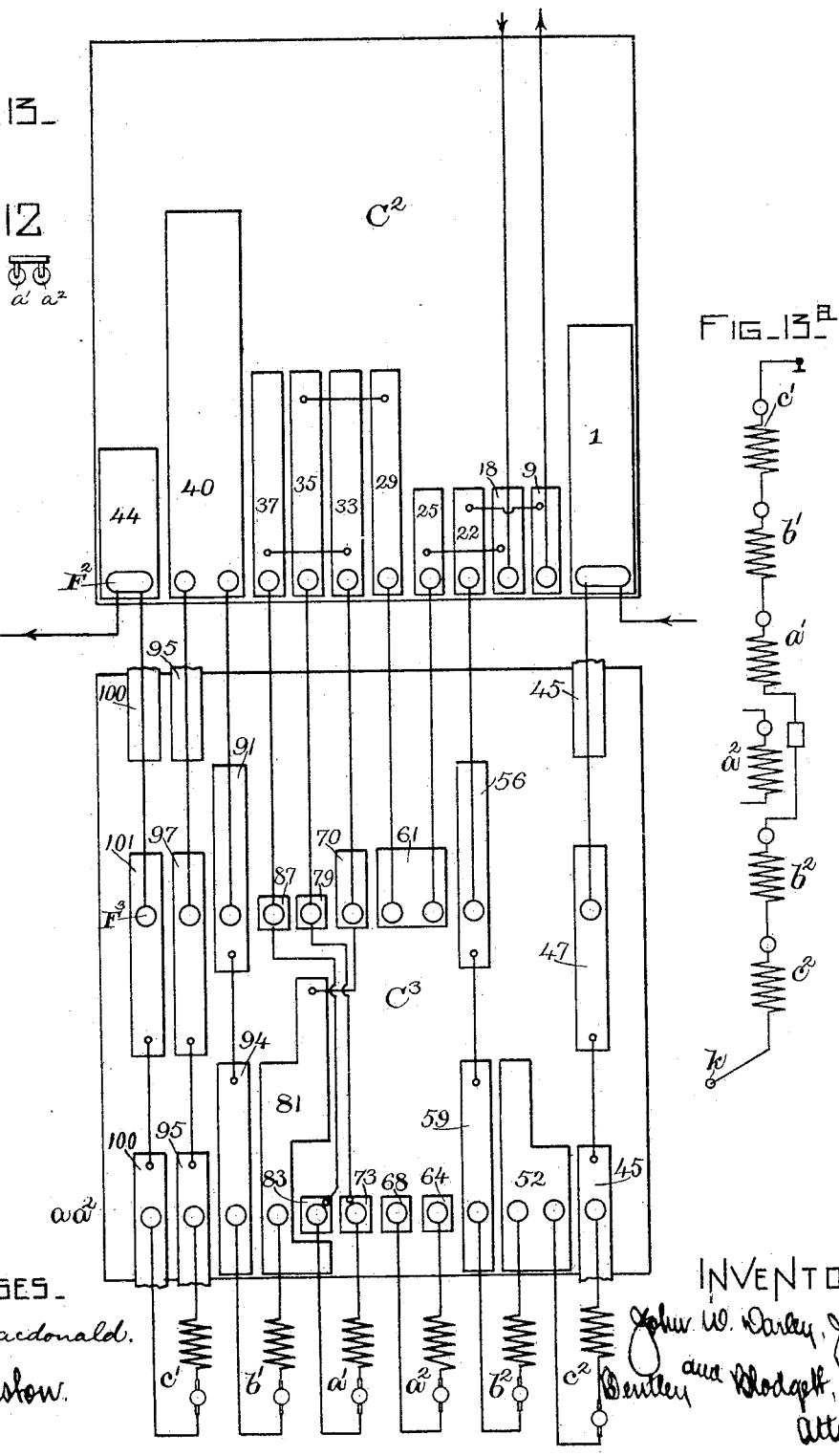

(No Model.) 14 Sheets—Sheet 9.
J. W. DARLEY, Jr.
CONTROLLER FOR ELECTRIC LOCOMOTIVES.
No. 530,507. Patented Dec. 11, 1894.
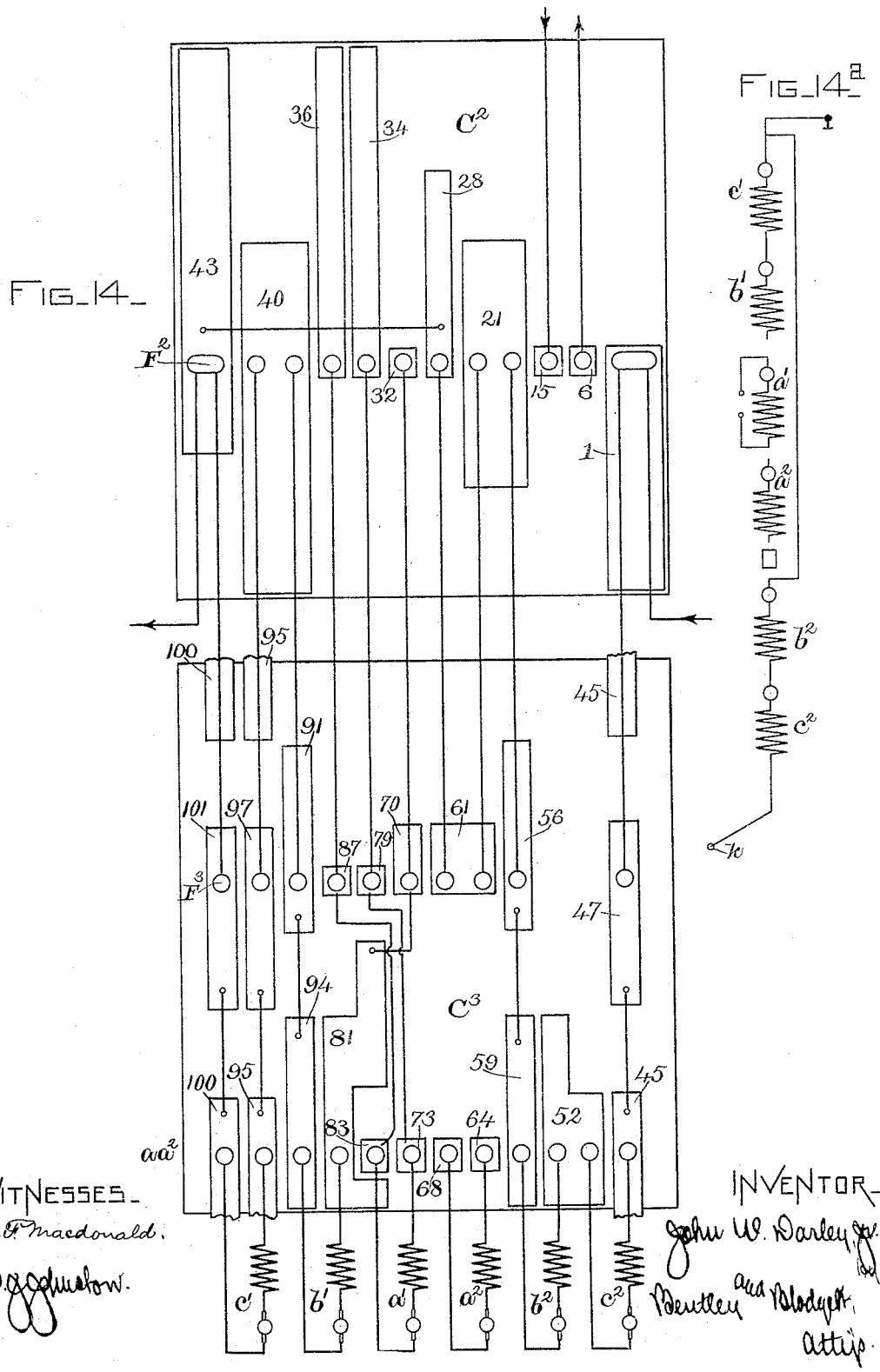
WITNESSES
A. F. Macdonald
S. G. Johnston
INVENTOR
John W. Darley Jr.
by Bentley and Blodgett
attys.

(No Model.) 14 Sheets—Sheet 10.
J. W. DARLEY, Jr.
CONTROLLER FOR ELECTRIC LOCOMOTIVES.
No. 530,507. Patented Dec. 11, 1894.
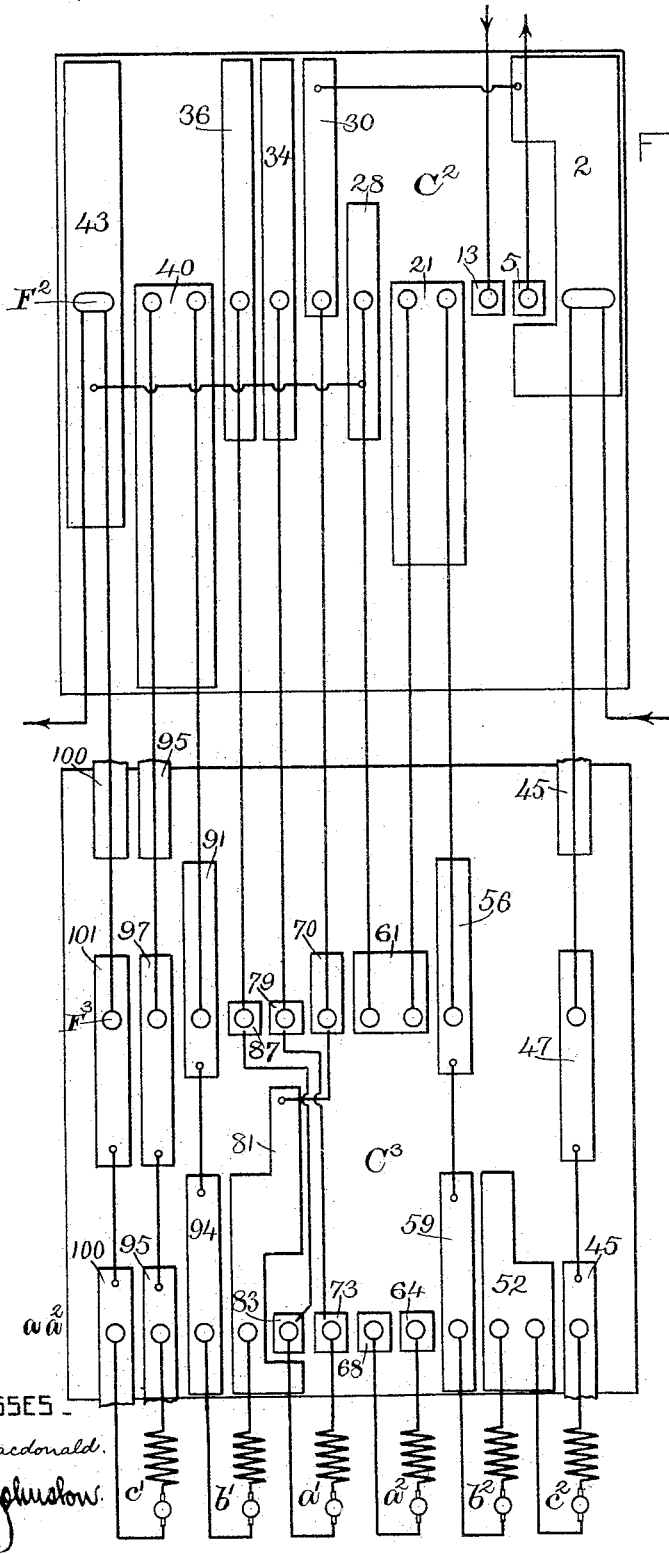
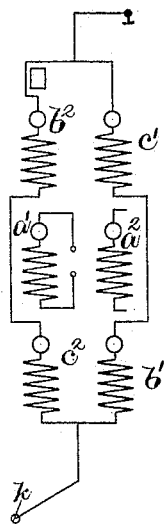

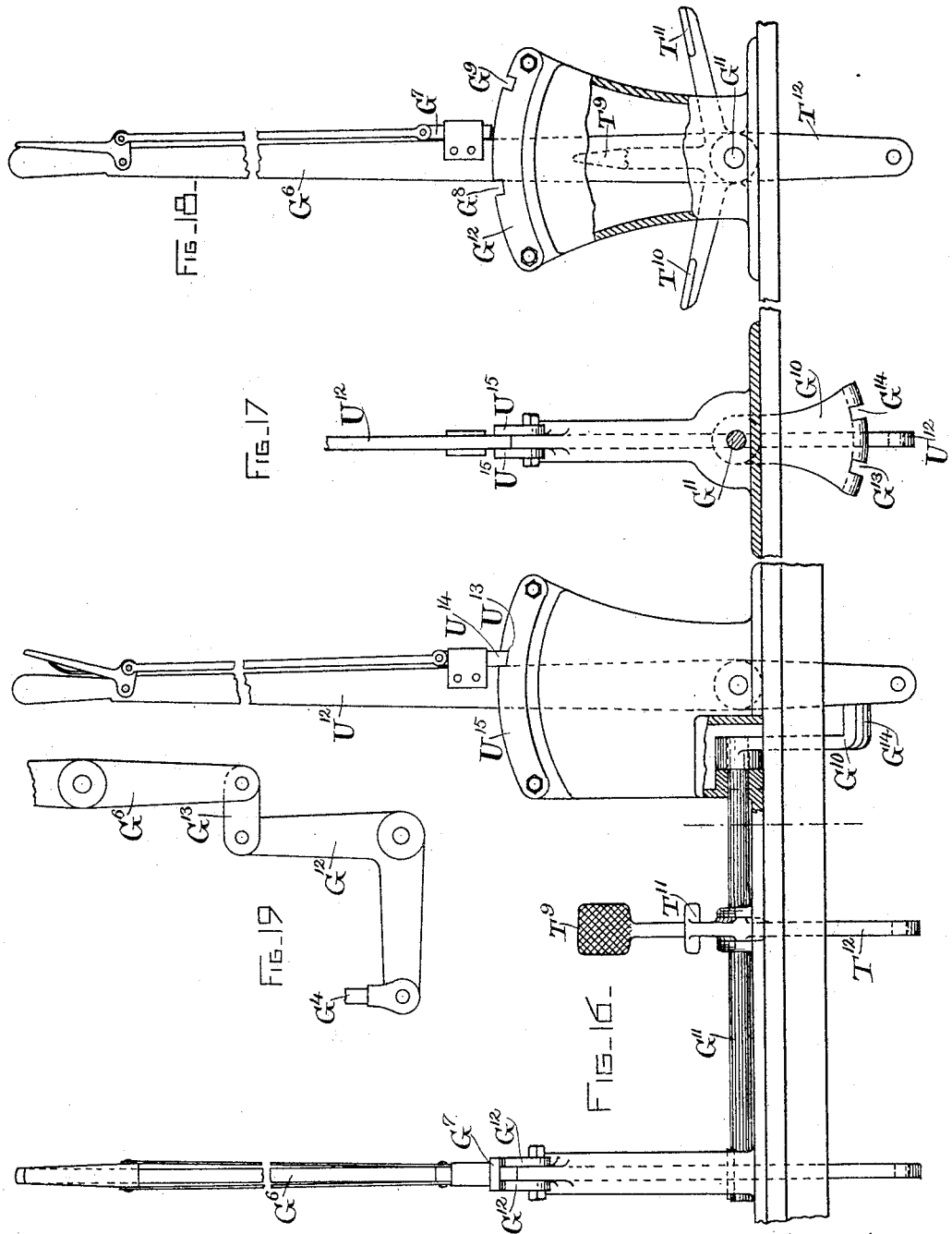

(No Model.) 14 Sheets—Sheet 12.

J. W. DARLEY, Jr.
CONTROLLER FOR ELECTRIC LOCOMOTIVES.

No. 530,507. Patented Dec. 11, 1894.

WITNESSES
A. F. Macdonald.
J. J. Johnston

INVENTOR
John W. Darley Jr.
by Bentley and Blodgett
Attys

THE NORRIS PETERS CO., PHOTO-LITHO., WASHINGTON, D. C.

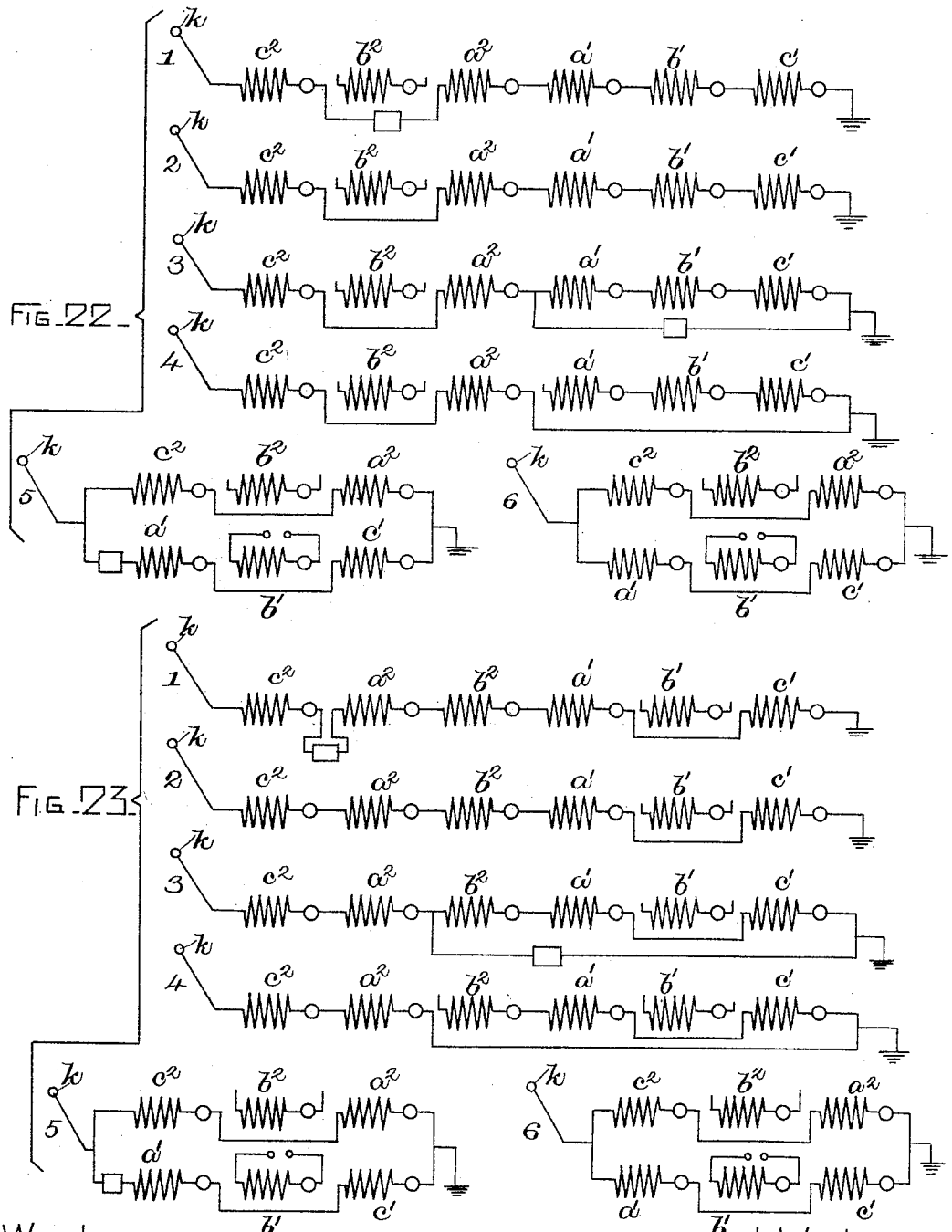

(No Model.)

J. W. DARLEY, Jr.
CONTROLLER FOR ELECTRIC LOCOMOTIVES.

No. 530,507. Patented Dec. 11, 1894.

WITNESSES—
A. F. Macdonald
T. J. Johnston

INVENTOR—
John W. Darley, Jr.,
by Bentley and Blodgett,
attys.

United States Patent Office.

JOHN W. DARLEY, JR., OF BALTIMORE, MARYLAND, ASSIGNOR TO THE GENERAL ELECTRIC COMPANY, OF BOSTON, MASSACHUSETTS.

CONTROLLER FOR ELECTRIC LOCOMOTIVES.

SPECIFICATION forming part of Letters Patent No. 530,507, dated December 11, 1894.

Application filed November 16, 1893. Serial No. 491,145. (No model.)

*To all whom it may concern:*

Be it known that I, JOHN W. DARLEY, Jr., a citizen of the United States, residing at Baltimore, State of Maryland, have invented a certain new and useful Improvement in Controllers for Electric Locomotives, of which the following is a specification.

My invention relates to the control of the motors of electric locomotives and particularly to the requirements of apparatus employed in heavy traffic, necessitating the use of a number of motors upon each locomotive; and has for its object to construct a compact apparatus operated preferably, though not necessarily, by power, (as for example, by compressed air,) controlling the speed and the power by the "series-parallel" system, as it is commonly called. In this system as developed in the mechanism herein described and illustrated, the motors are combined, either with or without a resistance, though it is usually employed, in various combinations in series or parallel, to give various speeds and torques; and my invention resides in the mechanical and electrical means I employ to effect these combinations readily, rapidly, and safely.

It further resides in the improved means I adopt of breaking the circuit upon an excess of current without damage to the controller, and in certain interlocking devices, whereby it becomes practically impossible to operate the apparatus except in the manner in which it is designed to be used; and lastly, in many details contributing to the efficiency and ease of operation and repair of the controller, all of which will be more fully described hereinafter, and the novelty of which will be definitely pointed out in the claims.

To attain the ends pointed out, I provide a vertical frame, in which I mount four horizontal cylinders, provided with contacts adapted to make connection with stationary brushes, by the revolution of which cylinders the path and effect of the current are changed, as hereinafter pointed out. The main or "commutating" cylinder serving to alter the relation of the motors, is preferably revolved in either direction at will by power. This cylinder has four running positions in which positions only it may be brought to a stand. Geared to it so as to make five revolutions for each turn of the commutating cylinder is a resistance-cylinder, by which the amount of resistance in circuit may be varied in the first running position. By five revolutions I do not mean five complete turns, but four complete turns and a nearly complete fifth turn, upon which the resistance cylinder advances to the last position or its short-circuiting position. Should it move a full turn on its fifth revolution, the circuit would be opened, as will be better understood hereinafter. The commutating cylinder does not make a complete revolution, but such part of a revolution as it does make is sufficient to turn the resistance cylinder through the four complete turns and the fifth partial turn, as just explained. Below the commutating cylinder and having motion independent of it, I arrange a cut-out cylinder, operated by hand; and below this cut-out cylinder I place a reversing cylinder having motion independent of the cut-out cylinder and only connected to the commutating cylinder by interlocking mechanism designed to prevent the reversal of the motors except when they are so connected as to make it safe to reverse them. I thus combine in a single compact piece of apparatus taking but little room in the cab all the mechanism needed to control the motors of a large locomotive.

In the embodiment of my invention herein illustrated I have shown it applied to a locomotive having six motors; but it may be equally well employed with eight or more, or with a less number. Many variations may also be made from the precise arrangements shown, without departing from the spirit of my invention; all of which I aim to embrace by my claims.

Figure 7:
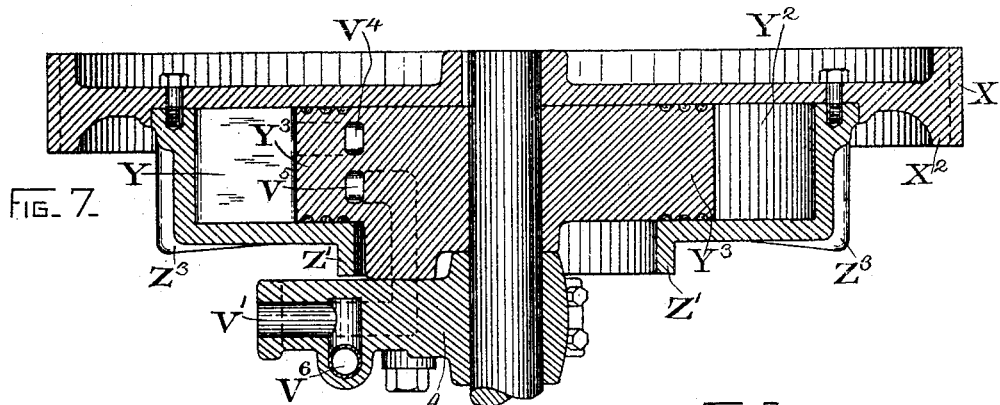
Figure 8:
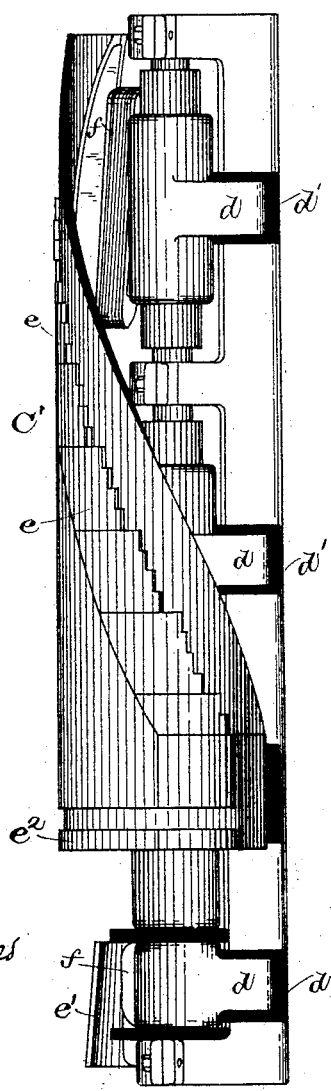

In the accompanying drawings hereby referred to and made part of this specification, Figure 1 is a side elevation; Fig. 2, an enlarged side view of the commutating and resistance cylinder-gearing, the circuit-breaker hereinafter described and the commutating and resistance cylinders being removed to show the construction, and the air-engine being shown in dotted lines and its valve-gear in section. Fig. 3 is an enlarged side elevation; Fig. 4, a front elevation, and Fig. 5 a sectional detail upon the line 5—5, of Fig. 4, of the circuit-breaker I employ. Fig. 6 is a detail of a stop employed for the commutating cylinder. Fig. 7 is a sectional view of the air-engine, taken on the line 7—7 of Fig. 2, the valve being omitted. Fig. 8 is a side elevation and Fig. 9 an end elevation of the resistance cylinder, showing the blow-out magnets therein; Fig. $9^b$, a detail of one of these blow-out magnets. Fig. 10 is an enlarged rear elevation showing the brushes upon the resistance and commutating cylinders and one set of brushes respectively upon the cut-out and reversing cylinders. Fig. 11 is a view showing the contacts and cross connections of all the cylinders, developed in plane. Figs. $1^a$ to $9^a$ are diagrams of the motor connections corresponding to the positions 1 to 9 of the commutating cylinder. Fig. 12 shows the motor designations which I adopt. Fig. 13 shows the cut-out cylinder with the motor $a^2$ cut out, the commutating-cylinder being in its first position. Fig. 14 shows the cut-out cylinder in the same position, the commutating cylinder being in its first multiple position, and Fig. 15 shows the cut-out cylinder still in the same position, while the commutating cylinder is in its first running position in multiple; in the last three views only the operative contacts being illustrated. Figs. $13^a$, $14^a$, and $15^a$ show diagrammatically the connections in the position shown in Figs. 13, 14, and 15. Figs. 16, 17, and 18 are side and end elevations respectively of the stands and operating handles by which the movements of the apparatus are controlled. Fig. 19 is a detail. Figs. 20 to 25, inclusive, show the various combinations of motors when the cut out cylinder is in positions adapted to cut out one of the motors.

Like letters and figures denote like parts in all the views.

In Fig. 1, A is a vertical frame, secured at top and bottom by the bolts B, B, to the framing of the cab or other suitable support secured thereto. C' is the resistance cylinder, shown best in Figs. 8 and 9, described hereinafter. $C^2$ is the commutating cylinder, actuated by a rotary air engine, as shown in Figs. 2 and 7. $C^3$ is the cut-out cylinder, operated by hand through the gear $I^3$, the worm $I^2$, and the handle I. $C^4$ is the reversing cylinder, having only two positions, as indicated by the notches G', $G^2$, serving as stops for the bent lever $G^3$, and operated by the rotating arm or lever G, which in turn is actuated by the rod $G^4$, which is preferably attached to a treadle or operating lever. Not shown. D, D, &c., are the stranded cables serving to convey the current, which are of large size and adapted to carry any possible current which may be used in the system.

The parts of the circuit-breaker are shown in their proper position on the controller, K being a pole-piece of the blow-out magnet; K', the chimney or box into which the arc is blown; L', $L^2$, $L^3$, $L^4$, the magnetic circuit of the apparatus, all more fully described in connection with the detail views in Figs. 3 and 4.

Referring to Fig. 2, the interacting devices by which I secure only a motion of the resistance cylinder appropriate to the position of the commutating cylinder are illustrated, in connection with the air-engine. U is a rod, actuated by a suitable handle (not shown) and operating a lever U', rocking upon a stud, $U^3$, attached to the frame A. A short offset arm $U^5$ carrying a friction roller, $U^9$, projects from the lever U', and engages with notches or cut-away portions $Z^2$, $Z^2$, $Z^2$, $Z^6$, of a raised flange or rim Z' upon the commutating cylinder $C^2$. It will be observed that when the roller $U^9$ engages with either of the notches $Z^2$, &c., it allows the cylinder $C^2$ to be brought to a stand. This cylinder is geared to C' by the gears X, X', and hence in these positions the cylinder C' is also brought to a stand. When the roller engages with the notch or cut-away part $Z^6$, however, as shown in the drawings, the rotation of the cylinder $C^2$ is not stopped thereby, and as this notch comprises approximately one-fifth of the circumference, the cylinder C' may be completely revolved, thus interposing any desired amount of resistance within the capacity of the rheostat employed. The cylinder is illustrated in the "off" position.

It is necessary that the resistance cylinder should have a series of definite contact-positions (to prevent partial contacts and avoid arcing) in which only it may stop. To attain this object, the lever U' carries upon its end at $U^4$ a rod $U^6$, which at its upper end is connected to a toggle $U^8$, operating to advance and retract the stop $U^7$, which engages at determinate points with the notches W, W, &c., arresting the cylinder C' at proper points where its contacts are fully made. As will be readily observed, the stoppages of the cylinder C' also arrests the cylinder $C^2$, so that the roller $U^9$ on the arm $U^5$ will only move in the notch $Z^6$ until such time as the detent or stop $U^7$ enters one or another of the notches W. The two cylinders are thus perfectly interlocked in such manner that it is impossible for either of them to move except as may be intended or to stop except at a running position.

It is to be understood that the resistance can only be varied in the first running positions of the commutating cylinder. In making the other combinations the resistance is not capable of being changed, although suitable notches might be provided in the flange Z' (which acts as an index for the commutating cylinder), permitting a variation of resistance in other positions of that cylinder. By this I mean, not that the resistance is cut out or in toto, but that there is no running position after the first in which the resistance is in circuit.

In dotted lines in Fig. 2, is shown the air-engine operating the commutating cylinder, its valve being shown in section; Fig. 7 being also referred to. Y is the piston, the engine being of the rotary type, and Y' the fixed abutment, made in one piece with the core $Y^3$ of the engine. $Y^2$ is the channel in which the piston travels. As will be seen, the revolution of the piston is three hundred and fifty degrees, more or less, being limited in both directions by the fixed abutment Y'. V is the valve, which is a double headed piston valve, reciprocating in the cylinder $V^7$. V' is the entrance-port. The pressure is balanced upon the two valve pistons by the tendency of the air to expand in all directions. The ends of the valve-cylinder are perforated, and furnish exhaust-ports for the escaping air. $V^2$, $V^3$ are the end-ports, communicating with the interior of the engine. The valve-stem engages at $U^4$ by a pin and slot with the lever U', so that by the one motion of the operating handle (not shown), the engineer, moving the rod U, releases the resistance cylinder C' by the withdrawal of the detent $U^7$, releases the commutating cylinder by retracting the arm $U^5$, and turns the air into the channel of the air-engine.

The operation of the device is as follows: The piston being at the end of its stroke the admission of air behind it can force it no farther, the left hand face of the lug $Z^4$ bearing upon the pin $I^{11}$. The motion of the rod U being thus limited to the downward direction releases the cylinders as described, and throws the valve V up, thus admitting the air supplied through the pipe $V^6$ and the port V' to the port $V^2$ and thence through the connecting channel $V^4$ to the clearance space between the piston and its abutment. The piston is forced around and thus rotates the cylinders. To rotate the engine in the opposite direction, the rod U is thrust upward, reversing the action through the port $V^3$, channel $V^5$, and the corresponding clearance space on the other side of the abutment; the roller $U^9$ in this case sliding upon the inner side of the flange Z', as will be more readily understood from Fig. 7.

The ribs $Z^3$, $Z^3$, &c., are cast upon the parts of the air engine to give it sufficient strength and rigidity to adapt it to the strain and shock to which it is subjected.

The operation of the cut-out cylinder is seen in Figs. 1, 2 and 3. $C^3$ is the cut-out cylinder, to the end of which is affixed the worm-gear $I^3$, actuated by the worm $I^2$ upon the shaft I', turned by the handle I. Upon the gear $I^3$ and preferably formed integral therewith, is the return-cam $I^4$, in which reciprocates the pin $I^7$ upon the lever-arm $I^6$. This pin may be provided if desired with a friction roller. The lever-arm $I^6$ is attached to and reciprocates the rock-shaft $I^8$. Referring now to Fig. 2, it will be seen that the shaft $I^8$ rocks in a bearing formed in the projecting arm A' of the frame A. Upon the other side of this bearing the arm $I^9$ is carried by and rigidly keyed to the shaft $I^8$, so that, by the rotation of the handle I, the cam $I^4$ depresses or raises the arm $I^6$, turns the shaft $I^8$, and correspondingly depresses or raises the arm $I^9$. Actuated by this arm is the stop-block $I^{10}$, a pin from which, $I^{11}$, projects through the slot $U^{10}$ in the arm $U^2$. The slot serves as a guide for the block, sliding upon the lever arm $I^9$ and the arm $U^2$ takes the shock brought on the block by the stopping of the engine.

To understand the operation of the parts just described, it should be stated that the different running combinations of the motors, irrespective of the resistance, are as follows: First, all in series; second, in two groups of three; third, in three groups of two. Suppose that one of the motors be disabled by any accident, and is to be cut out, it is then desirable to still employ the mate of the disabled motor in the series positions; but it is obvious that it cannot be employed in the multiple combinations, as it would throw the different circuits out of balance. I therefore provide the cut-out cylinder with the means just described, which act to stop the rotation of the resistance and commutating cylinders at the sixth position or first running position in multiple, where the motors are divided into two groups of three each; the third position being the last one in which the mate of the disabled motor could be used. The disabled motor and its mate would be necessary elements in any further advance. This may be better seen from the description of Fig. 11, hereinafter, in which the connections and contacts of the cylinders are shown in plane.

The rotation of the cut-out cylinder will, by the mechanism shown, shift the position of the stop $I^{10}$ so that, as the commutating cylinder is revolved, it is brought into register with the lug $Z^5$ on the flange $X^2$ according to the position of the cut-out cylinder; it being always in register with the stop $Z^4$, except when a motor is cut out, when it registers with $Z^5$ and the commutating cylinder is thus prevented from passing to those positions in which either the disabled motor or its mate are essential factors.

The sudden reversal of current in the motors while running would be productive of serious injury, if not of immediate destruction. The current passing through the armature being assisted instead of opposed by its electro-motive-force would burn up the motor. Although the circuit-breaker is designed to act in the case assumed, its action might be too slow to prevent all damage, by reason of the inertia of its parts, they being designed in the apparatus illustrated to break with safety a circuit carrying two thousand seven hundred ampères at five hundred volts potential, or about eighteen hundred electrical horse power, and being of considerable size and weight. I therefore arrange interlocking devices between the commutating cylinder and the reversing cylinder in such manner that the latter is locked except when the commutating cylinder is in its off position, with the circuit open.

The reversing cylinder has two positions. Referring to Fig. 11, where $C^4$ represents the surface of the cylinder developed in plane, it will be seen that the two rows of contact-plates are cross-connected, so that when the brushes $F^{4a}$ rest upon the upper row of plates and those marked $F^{4b}$ upon the lower row, the current passes through the armatures in one direction, while when the cylinder is rotated into its second position, the brushes are in the position shown in dotted lines, and the current then passes in the reverse sense through the armature. The two positions correspond to the notches $G'$, $G^2$, Fig. 1, with which the lever-arm $G^3$ engages. In this figure, a rod H is attached to and moves vertically with the arm $G^3$, having bearings in lugs $H'$, $H'$ upon the frame A, and moving against the pressure of the spring $H^2$, tending to depress the arm $G^3$ into the notches $G'$, $G^2$. The upper end of the rod is bent at $H^4$ and engages with a pin $H^3$ upon the rotary yoke C attached to the commutating cylinder $C^2$, which lifts the rod and arm $G^3$.

The operation is as follows: So long as the commutating cylinder is in its first position, the pin $H^3$ engages with the bent portion $H^4$ of the rod H and holds the arm $G^3$ from engaging with the notches $G'$, $G^2$. The reversing cylinder is thus free to move. When the commutating cylinder is moved from its illustrated position, the spring $H^2$ forces down the arm $G^3$ to an engagement with one or the other of the notches $G'$, $G^2$, thus holding the reversing cylinder in place until the commutating cylinder is returned to its first position.

A circuit-breaker peculiarly adapted to the requirements of my improved controller is illustrated in Figs. 3, 4 and 5. K is a pole-piece of the arc-rupturing magnet, the yoke of which is surrounded by the coil $K^2$, wound in such a direction as to force the arc upward, which in the case illustrated, is left-handed. $K'$, $K'$, &c., are the sides of the chimney or box in which the arc is formed. These parts are of some refractory material, as is also the part $K^3$ (shown in section in Fig. 5) which is a slab of insulation designed to protect the winding $K^2$ from any sparks or molten metal which might drop upon it.

Turning now to Fig. 5, Q is the rod carrying the movable contacts of the circuit-breaker; the parts illustrated in this figure showing only the shunt or subsidiary contacts. Upon the end of this rod, which should be of machinery steel, is a copper terminal or contact-piece $Q^4$, secured to the rod by a screw, $Q^9$. In the end of this contact-piece is a small screw-threaded hole $Q^{10}$. (Seen in Fig. 4.) By taking out the screw $Q^9$, a wire being inserted into the hole $Q^{10}$, the terminal may readily be removed. The terminals $Q^5$, $Q^5$ are secured to the ends of the circuit by the screws $Q^8$, $Q^8$. Their corresponding terminals $Q^6$, $Q^6$ are held in engagement by the leaf-springs $Q^7$, $Q^7$, thus affording a ready means of renewing all of these pieces. The entire arcing effect of the current, whenever the circuit is broken, is localized at these contacts, as will be more fully explained when the circuits are pointed out, and their ready renewal is of great importance.

Again recurring to Fig. 3, $Q^2$ is a collar made fast to the end of the rod Q. $Q'$ is a spring, bearing at one end against this collar, and at the other against the lug $T^7$, cast or otherwise formed upon the frame of the apparatus, and tending to force the rod outward, giving it a powerful snap-action. S is the main switch or bridging-contact between the terminals R, $R'$, made of laminæ of tempered copper or other suitable good conducting material. When forced into contact, this bridge wipes or slides over the surface of the terminals R, $R'$, removing any dirt, and keeping them bright. This being the path of the main current, it is imperative that no injurious heating arise from imperfect contacts. $Q^3$, $Q^3$ are lock-nuts determining the position of the bridge S upon the rod Q. They also serve to adjust the opening of the contacts $Q^4$, $Q^5$, $Q^6$, so that it will occur after the bridge S has completely left the terminals R, $R'$.

The circuits are as follows, as may be traced in the diagram shown in connection with Fig. 11: The current entering from the trolley $k$, passes around the series coil L and across the bridge S between the terminals R, $R'$ to the cable D, and so on through the controller to ground. A shunt circuit is taken from the coil L around the magnet N, energizing it to attract the armature O, and thence to ground. A second shunt circuit leaves the terminal R and passes around the blow-out magnet K in the coil $K^2$ to the circuit-making rod Q and thence to the terminal $R'$ to rejoin the main current. This shunt is composed of rather large wire, as it must be capable of carrying for an instant the entire current, when the bridge S is lifted from the terminals R, $R'$; while the shunt around the magnet N must be of small sized high-resistance wire.

T is a toggle, one arm of which is pivoted at $T^6$ to the rod Q. The other arm is a bell-crank lever having a detent $T^3$, engaging with the insulated projection $M'$ upon the armature M, and is pivoted at $T^5$ to the lug $T^7$. The toggle is so arranged that it is never upon a "dead center." $T^2$ is a bell-crank, also pivoted to the lug $T^7$ at $T'$, one arm of which is connected to a rod $T^4$, going to a treadle, not shown, and the other arm is arranged to engage the projection $M'$, and by thrusting it up, to release the detent $T^3$, causing the toggle to collapse under the pressure of the spring $Q'$ and breaking the circuit, as will be readily understood. This arm also communicates the downward motion of the rod $T^4$ to the rod Q through the medium of the lug upon the back of the piece $T^6$. In any emergency, the engineer may thus, by a kick, break the circuit without using his hands or incurring risk.

It is important that the range of the circuit-breaker be limited, so that any excess or diminution of current within certain limits may act to break the circuit automatically, and thus preserve the motors from injury. Too great a current is apt to cause destruction of the motors, and on the contrary there is the risk that, should the current cease for a time or fall so low that the motors slow down materially, they may be left in circuit with no resistance. As they then generate no counter-electromotive force, when the current comes on again with strength, as it is apt to do, it develops great torque and heats up and burns out the armatures before they can get up speed. While this is less likely to occur in a locomotive than with stationary motors, on account of the constant attendance of the engineer, it is provided for automatically as follows: I provide in the main-circuit a coil L of few turns and large size, having a fixed iron core L′, with a pole piece $L^4$. A second core $L^2$ is arranged adjacent to this series coil, having an extension or pole-piece $L^3$. Between these pole-pieces is the rotary yoke C, attached to the shaft of the commutating cylinder $C^2$, and revolving therewith. The periphery of the yoke is cut-away in steps, so that the air-gaps between the pole-pieces $L^3$, $L^4$ and the yoke vary with the position of the commutating cylinder, thus varying the magnetism in the core $L^2$, which is the active or co-operating element with the armature M. This is the maximum coil, or coil limiting the current to a maximum beyond which it cannot pass without disrupting the circuit.

The electro-magnet N acts as a minimum coil, and determines the lowest point to which the current may fall. It is provided with an armature O, hinged at O′, and held down by the attraction of the core N′. Attached to the outer end of this armature is a rod $P^2$, surrounded by a coil spring P, acting to raise the armature O. This rod passes loosely through the armature M, but is provided with an enlargement or lug $P^4$, below it, so that its upward motion lifts the armature out of engagement with the detent $T^3$, releasing the rod Q and breaking the circuit. To the free end of the armature M is attached the spring P′, the pull of which may be adjusted by means of the lock nuts $P^3$, $P^3$ to oppose the spring P to any desired degree, though it must never be so great as to prevent its pulling up the armature M when the armature O is unattracted. It will be seen from this description that when the current ceases or falls below a predetermined amount, the attraction of the core N′ is insufficient to hold down the armature O. The spring P then forces up the armature, carrying with it the rod $P^2$ and pulling up the armature M, thus breaking the circuit.

The function of the nuts $P^3$ $P^3$ is to so adjust the tension of the spring P′ that when a motor is cut out it will be increased fifty per cent. This is accomplished by having these nuts bear on an insulated bushing in the lever arm $I^6$, from which it is evident that when the cut-out cylinder is moved, the spring P′ will be put under greater tension (adjustable to any degree), as the upper nuts $P^3$ take the normal tension of the spring P′ and the lower nuts $P^3$ may be adjusted at any desired distance from the abutting face of the insulating washer in the lever arm $I^6$. The necessity for this additional adjustment arises from the fact that should a motor be cut out, at the final commutation when disabled, there are two motors in series and two in parallel which must carry in each branch (in the apparatus illustrated) thirteen hundred and fifty ampères, the normal current being but about nine hundred ampères. Were it not for the above arrangement to provide for this emergency, the circuit-breaker must be continually set for an overload of fifty per cent., which is too great a margin for safety.

The determination of the air-gap between the pole-pieces $L^3$, $L^4$ and the rotary yoke C is to a great extent experimental, inasmuch as the magnetic permeabilities of any two pieces of iron are unlike and unascertainable by workshop methods. An approximation may be had by following the form illustrated; and a more accurate adjustment by altering the balance of the springs P, P′, as already explained.

As will be observed, there are three degrees of approximation between the surface of the cam and the magnetic pole-pieces. This is needful by reason of the connections of the motors rendering necessary a capacity in the circuit breaker of nine hundred, eighteen hundred, or two thousand seven hundred ampères, according to the combination of the motors in series, in two branches in multiple, or in three branches in multiple. The position of the commutating cylinder determining the combination, and the cam C being fixed to the axis of this cylinder and rotating with it, its position will determine the strength of the magnetic circuit and consequently the operating point of the circuit-breaker. Thus, when the circuit is broken either by the engineer or automatically, the bridge S is lifted from the terminals R, R′. The current then passes by the shunt through the coil $K^2$, energizing the blow-out magnet, and passing to the terminals $Q^5$, &c. Upon breaking contact at these terminals, the magnet expels the arc, and the current ceases.

Figure 9:
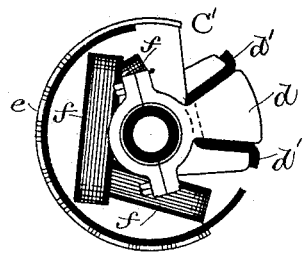
Figure 9B:
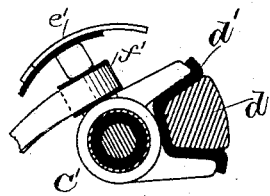

In Figs. 8 and 9 I show the construction of the resistance cylinder. C′ is the body of the cylinder, mounted in suitable bearings, from which it is properly insulated. From each bearing-box projects a lug $d$, separated from the supporting frame by insulating material $d′$, such as soft rubber, which also acts as a cushion. Step-by-step contact plates $e$, $e$, &c., are arranged on the cylinder, in a manner well-known in the art, upon which the brushes F′ (Fig. 10) bear to cut in successive sections of resistance in multiple as the cylinder is revolved. The auxiliary contact $e'$ is provided for a part of these brushes, for a purpose hereinafter explained; and all of the contacts are arranged over the blow-out magnets $f, f, f$, which prevent the destruction of the contact surfaces by arcing, as the contacts are broken.

Fig. 10 shows the mechanical arrangement of the visible electrical connections; the cables D, D, being those conveying the main current. $h, h$, &c., are the motor leads, and $i, i$ the resistance terminal cables. $F', F^2$ are the brushes of the resistance cylinder and the commutating cylinder respectively, and $F^3, F^4$ are respectively one set of the brushes of the cut-out and reversing cylinders, of which brushes there are two sets upon opposite sides of the cylinders, as shown in Fig. 1, and diagrammatically in Figs. 11, &c. Between the brushes on each cylinder are septums $g', g^3, g^4$ of insulating material, preventing the formation of short-circuiting arcs between adjacent brushes, those on one side of the cut-out cylinder and on the commutating cylinder being continuous.

Fig. 11 is a general view of the four cylinders developed in plane. The particular combinations shown illustrate the position of the controller when the motors and resistance are connected as in the diagram $1^a$, the brushes of the commutating cylinder being supposed to rest on the line 1—1 of the cylinder and being shown out of position to make the connections more clear.

The various contact plates upon the cylinders $C^2, C^3$ are numbered consecutively from 1 to 103. Several of the plates upon the cylinder $C^3$, as 45, 60, 65, 95 and 100 are cut by the development of the cylinder and are in reality continuous, the cut ends being indicated by the broken lines at the top and bottom of the diagram. The plates are also cross-connected, as indicated by the dotted lines. The cross-wires connect only the plates upon which they terminate, being insulated from all others.

To understand the path of the current, the positions of the motors are taken from Fig. 12, from which it will be seen that the motors are placed in sets of two; and by tracing the circuit, that the current passes first into one motor of each set, and then into the others. By this arrangement the whole weight of the locomotive is utilized for traction, being distributed on all the axles, and slipping of the wheels is avoided. This particular method of connection is not essential, though useful, and may be departed from, especially in the case of stationary motors. This method of connecction, however, gives an active unit on each truck when cutting out three motors and changing from series to multiple combination; and two active units on the middle truck and one active unit on each of the end trucks, in changing from the first multiple to the three in multiple and two in series position.

The circuit shown in Fig. 11 is as follows: The current enters from the trolley $k$, passes through the circuit-breaker, to the cable D, one of the brushes $F^2$ and by the contact-plate 1 upon the cylinder $C^2$ to another of the brushes $F^2$, (although the two brushes $F^2$ are metalically connected in multiple to the cable D and serve to convey the current to the contact plate 1, which acts as a distributing point rather than to make connection between the brushes,) by cable to the brush $F^3$ bearing upon the contact-plate 47 of the cylinder $C^3$. In further tracing the circuit, the brushes will not be enumerated, their office being well understood. The plate 47 is cross-connected to the plate 45, from which the current passes to the reversing cylinder $C^4$, passing through the motor $c^2$ and returning to the cylinder $C^3$ at plate 52; from thence passing again through the reversing cylinder and through the motor $b^2$ to plate 59 on $C^3$, by the cross-connection to the plate 56, thence to plate 22 upon $C^2$, thence by the cross-connection to the plate 9 upon $C^3$; from there passing to the resistance cylinder, all of the resistance being cut in in multiple. At the beginning of the motion of the resistance cylinder all the resistance is out of circuit and so long as the brushes $F^2$ rest upon the plates 9 and 18, as represented, the resistance cylinder may be revolved without affecting the combination of the motors and thus gradually short-circuit the resistance until it is cut out entirely. Returning from the resistance-cylinder, the current enters contact-plate 18, $C^2$, thence by cross-connection to plate 25, thence to plate 62, $C^3$, by cross-connection to plate 60, through the motor $a^2$, returning to plate 65, $C^3$, by cross-connection to plate 66, thence to plate 29, $C^2$, by cross-connection to plate 35, thence to plate 80, $C^3$, back to plate 37, $C^2$, by cross-connection to plate 33, to plate 71, $C^3$, by cross-connection to plate 69, through the motor $a'$, back to $C^3$ to the plate 81, through the motor $b'$, to $C^3$ upon the plate 94, by cross-connection to plate 91, to $C^2$ upon plate 40, back to $C^3$ to plate 97, by cross-connection to plate 95, through the motor $c'$, back to $C^3$ to the plate 100, by cross-connection to plate 101, thence to $C^2$ on plate 44, and to ground. The combination of motors will be as in the diagram, Fig. $1^a$, the various contacts being omitted for clearness. From this position Fig. $2^a$ differs only in the revolution of the resistance cylinder to a point where all the resistance is cut out. Between these two positions (which are running positions, as are all those marked "R. P.") there are nine others, according to the amount of resistance in circuit, determined by the position of the cylinder $C'$. There are therefore ten speeds with all the motors in series, corresponding to the detent notches in the cylinder $C'$, Fig. 2. By tracing the circuits with the brushes $F^2$ on the line 2—2, $C^2$ it will be seen that the resistance terminals are also short circuited upon the commutating cylinder. The nine notches close together upon the resistance cylinder in Fig. 2 are the only running notches, the notch in which the bolt U⁷ is shown being the off position and the first notch W' is to permit the cylinder contacts stopping upon dotted line 1—1 of the resistance cylinder C', Fig. 11, when the two motors in series have been put in multiple with the other four, two in multiple and two in series, in making the last combination, that is, in position 9 upon the commutating cylinder C² Fig. 11. This is the only case in which this notch is used and it obviates the necessity of having a tenth position upon the commutating cylinder C² to short circuit the resistance cylinder. The short-circuiting positions in the other cases, as in position 2 in C², cannot be avoided as an insulator must be provided to prevent short-circuiting motors in making the next combination. As will be readily understood, the resistance is first short circuited upon its own cylinder, then short circuited upon the commutating cylinder, then opened upon the resistance cylinder and then open circuited upon the commutating cylinder when position 2 of C², Fig. 11, is reached.

Referring to Fig. 11, when the resistance is shunted around the motors, as for instance in changing from the combination shown in Fig. 2ª to that shown in Fig. 3ª, and when the resistance is placed in series with part of the motors to cut them in in multiple with the rest, as in changing from the combination shown in Fig. 4ª to that shown in Fig. 5ª, the circuit from the commutating cylinder to the resistance cylinder is first closed upon the commutating cylinder. Then the resistance is gradually cut in in multiple arc and finally short-circuited by the resistance cylinder, then short-circuited upon the commutating cylinder, then opened upon the resistance cylinder, and then opened upon the commutating cylinder. These operations are performed in this sequence in going on and in the reversed order in coming off, and whenever a circuit is made or opened from the commutating cylinder to the resistance cylinder the resistance cylinder has a little before reached a position which precludes the possibility of an electromotive force existing at the breaking points of the commutating cylinder; and thus it will be seen that there is absolutely no potential broken between the contacts upon the commutating cylinder.

Assuming the brushes F² to be upon either one of the lines 1 to 9 of the commutating cylinder C², it is easy to trace the circuits corresponding to the figures 1ª to 9ª inclusive (as in the manner just illustrated for the first position of the cylinder), so long as the cut-out cylinder C³ is left in its first position. It becomes somewhat more complicated when the cut out cylinder C³ is shifted to one of the lines a a², &c., and it is some of these more difficult positions which are explained and illustrated by Figs. 13, 14 and 15.

It is easily understood that it is impracticable to cut out one motor from any of the multiple positions without at the same time cutting out its mate; but it is also desirable to allow the mate of the disabled motor to run so long as the motors are used in their series positions. I therefore arrange upon the cut-out cylinder C³ a pair of contact-plates for each motor, adapted, when the cylinder is rotated to the position in which the brushes rest upon these contact plates, to cut out the motor referred to, absolutely; and by tracing the circuits it will be seen that the mate of the motor cut out has its terminals in the position assumed cross-connected to the contact-points $x$ and $y$ upon the cylinder C³, see Fig. 11; that is, the brushes of the disabled motor would be cross-connected to the fourth and fifth brushes of the cut-out cylinder, counting from the left, on C³, Fig. 11, and those brushes would therefore, be connected in the first three positions of the commutating cylinder C² with the contact plates 37, 35 respectively; but in the latter six positions of the commutating cylinder, they would rest upon the contact plates 34, 36, respectively, which have no cross connections and upon which no other brushes rest, so that the brushes resting upon them are open circuited and the motor is cut out so long as the cylinder is in the multiple positions.

In Figs. 13, 14 and 15 I have omitted all those plates which perform no function and have shown only those which serve to pass current in the particular positions illustrated in those figures. Entering in Fig. 13 from the trolley the circuit first reaches contact plate 1 upon the cylinder C², thence passes to contact plate 47, upon C³, by a cross-connection to plate 45, through the motor $c^2$, to plate 52, through the motor $b^2$, to plate 59, by cross-connection to plate 56, thence to plate 22 on the cylinder C², by cross-connection to plate 9, to the resistance cylinder, back from the resistance cylinder to plate 18, by cross-connection to plate 25, thence to cylinder C³ upon plate 61, back to cylinder C² by plate 29, by cross-connection to plate 35, to cylinder C³ upon plate 79, by cross-connection to plate 73, through the motor $a'$ to plate 83, by cross-connection to plate 87, to cylinder C² upon plate 37, by cross-connection to plate 33, to cylinder C³ upon plate 70, by cross-connection to plate 81, through the motor $b'$ to plate 94, by cross-connection to plate 91, to the cylinder C² upon plate 40, to cylinder C³ upon plate 97, by cross-connection to plate 95, through the motor $c'$ to plate 100, by cross-connection to plate 101, to cylinder C² to plate 44, and from thence to ground. It will be seen from thus tracing the connections that the terminals of motor $a^2$ are open-circuited upon the contact plates 64, 68, the circuit conditions being as represented diagrammatically in Fig. 13ª; while the commutating cylinder being still in the series positions, the terminals of $a'$ are still included in the circuit, through the plates 29, 33, 35, 37; and the engineer may thus have the benefit of the power of one additional motor in these positions.

Referring now to Fig. 14, the cut out cylinder is still shown in position to cut out the terminals of the motor $a^2$; but as this is the first of the multiple positions upon the cylinder $C^2$, the terminals of $a'$ must also be open-circuited. In the position of the commutating cylinder shown in the figure, the motors $b'$ and $c'$ are also temporarily out of action. This is, however, not a running position, and is shown only to illustrate one of the transition points in passing from series to multiple, the resistance being also cut out temporarily. Entering the cylinder $C^2$ at plate 1, the current passes as before through plates 47, 45, 52, 59 and 56, completing the circuits through the motors $c^2$, $b^2$, which in the position shown are the only ones in circuit, and passing then to plate 56 upon cylinder $C^3$, thence to plate 21 upon the cylinder $C^2$, back to plate 61 upon the cylinder $C^3$, thence to plate 28 upon the cylinder $C^2$, thence by cross connection to plate 43 and to ground. As will be observed, the motor $a^2$ is open circuited upon the plates 64 and 68, $a'$ upon the plates 34, 36, $b'$ upon plates 32 and 40, and $c'$ on the plates 40 and 43. The position illustrated is shown diagrammatically in Fig. 14$^a$ and corresponds to the figure 4$^a$ shown in connection with Fig. 11, except that one of the motors is shown cut out upon the cut-out cylinder, the other motors cut out being open-circuited upon the commutating cylinder.

In Fig. 15 is shown the first multiple running position with the motors $a'$ $a^2$ cut out, the motor $a^2$ by the operation of the cut-out cylinder and the motor $a'$ by the operation of the commutating cylinder. The circuit is as follows: Entering the commutating cylinder $C^2$ upon plate 2, the current divides and passes as before, first to plate 47, then to 45, through the motor $c^2$ to plate 52, through the motor $b^2$, to plate 59, by cross-connection to plate 56, thence to the commutating cylinder to plate 21, back to the cut-out cylinder to plate 61, then to plate 28 by cross connection to plate 43 and to ground. Returning to plate 2, the other half of the circuit is by cross connection to plate 30, thence to plate 70 upon cylinder $C^3$, to plate 81, through the motor $b'$ to plate 94, to plate 91, to plate 40 upon the cylinder $C^2$, to plate 97 upon cylinder $C^3$, to plate 95, through the motor $c'$, to plate 100, to plate 101, to plate 43 upon cylinder $C^2$, and to ground; the motor $a^2$ being thus open-circuited upon plates 64 and 68, while $a'$ is open-circuited upon plates 34 and 36 of the commutating cylinder.

Referring to Figs. 8, 9, 10 and 11, the path of the circuits in the resistance cylinder will be readily understood. $e\ e$ are the contact plates serving to cut in the sections of the resistance when the brushes F', &c., are brought upon these contacts side by side; the operation being best understood from Fig. 11.

As the breaking of the contacts would lead to excessive sparking from the large currents employed, I employ blow-out magnets, indicated diagrammatically in Fig. 11 by the dotted lines $f f$, &c. To supply these magnets with current I provide an auxiliary contact plate $e^2$, upon which bears a brush F'$^a$, and to which is connected one of the terminals of the three main magnets of the cylinder, $f, f, f$, the other terminal being connected with the main contact plate $e$. Owing to the fact that the first contacts broken are broken when there is no resistance in the circuit, sparking there is greater than at any other point upon the cylinder. I therefore provide an auxiliary contact plate $e'$, connected through an auxiliary blow-out magnet $f'$ to the contact plate $e$, and upon this auxiliary contact plate I break the first contacts. The auxiliary blow-out magnet $f'$ is wound with very heavy coils, by preference with copper tape such as is used upon dynamo field-magnets, as illustrated in Fig. 9$^b$. The path of the circuit in the resistance cylinder will be traced independently of the other cylinders, inasmuch as it is not modified by their position, except as already pointed out with reference to the commutating cylinder. The brush F'$^a$ on C' is connected to such a resistance as to give about twenty-five amperes in the blow-out magnets, which is virtually a shunt from trolley to ground, composed of the resistance and blow-out magnets connected in series, and is preferable to a high-resistance shunt magnet on account of its low cost and lower self induction, and to a series magnet, as the magnetization is substantially constant no matter how much the main current may vary. In the position illustrated no current would flow, as the circuit is open between the brushes F', the plate $e$, and the brush connected to F$^5$. Upon rotating the cylinder C', the brush F'$^a$ engages the contact plate $e^2$ and the current passes around and energizes the blow-out magnet $f$, &c., then passing by the contact plate $e$ to the lead F$^5$. As the cylinder advances farther the resistance brushes F' are successively brought into contact with the plate $e$, connecting in multiple arc successive sections of the rheostat until finally all of the resistance upon the left of the cylinder is in circuit, leaving only that connected by the brushes F'$^b$ cut out. Eventually these latter brushes touch the contact plate $e'$, and are successively connected in multiple arc, the current passing from them to contact plate $e'$, thence around the blow-out magnet $f'$ and thence to the contact plate $e$. The current passes from the commutating cylinder to the common terminal of one pole of all the resistance groups by the lead F$^4$, and returns by the lead F$^5$, which being connected to the brush adapted to bear upon the plate $e$, becomes the common terminal of the other pole of such resistance groups as have their brushes F' in contact with the plate $e$.

Herein the resistance cylinder is not permitted to stop in such positions as permit the passage of current in the resistances F'$^b$.

Referring to Fig. 8, it will be observed that the steps of the contact plate $e$ are uneven, every fourth one counting from the top end of the cylinder as illustrated, being deeper than the others. The deeper steps correspond to the running positions as shown on the index plate of the commutating cylinder C' in Fig. 2, and are so arranged to provide a greater breaking space in these positions for the current. The stopping of the cylinder being impossible at the other steps, a less depth is sufficient.

Referring now to Fig. 11, the path of the circuit when the brushes F$^2$ are upon the line 3 of the commutating cylinder, (the cut-out cylinder being in its illustrated position and the combination being as shown in Fig. 3$^a$,) is as follows: Entering by the plate 1 the current passes to plate 47, thence to plate 45, through the motor $c^2$, to plate 52, through the motor $b^2$, to 59, to plate 56, to plate 21, to plate 62, to plate 60, through the motor $a^2$, to plate 65, to plate 66, to plate 29, by the cross connection to plate 7, thence through the resistance cylinder, returning to plate 16, by the cross connection to plate 28, thence to plate 43 and to ground. The other half of the circuit starts from plate 29, which is cross connected to plate 35, thence to plate 80, thence to plate 37, by the cross connection to plate 33, to plate 71, to plate 69, through the motor $a'$, to plate 81, through the motor $b'$, to plate 94, to plate 91, to plate 40, to plate 97, to plate 95, through the motor $c'$, to plate 100, to plate 101, to plate 43, and to ground.

The combination shown in Fig. 4$^a$ having been traced with the motor $a^2$ cut out, and its course upon the commutating cylinder being the same, it will not be referred to again.

Assuming the brushes to be on the line 5—5 of the cylinder C$^2$, the cut-out cylinder maintaining its illustrated position and the combination being as shown in Fig. 5$^a$, the path of the current is as follows: Entering at contact plate 2, it passes to plate 47, to plate 45, through the motor $c^2$ to plate 52, through the motor $b^2$, to plate 59, to plate 56, to plate 21, to plate 62, to plate 60, through the motor $a^2$, to plate 65, to plate 66, to plate 28, by cross-connection to plate 43, and to ground. Returning to plate 2, the other part of the circuit is by one of the brushes F$^2$ through the resistance cylinder, returning to plate 14, cross-connected to plate 31, to plate 71, to plate 69, through the motor $a'$, to plate 81, through the motor $b'$, to plate 94, to plate 91, to plate 40, to plate 97, to plate 95, through the motor $c'$, to plate 100, to plate 101, to plate 43, and to ground.

The position illustrated by the diagram 6$^a$, being the first running position in multiple, having been already described in describing the action of the cut-out cylinder when the motor $a^2$ is cut out, will not be again referred to.

In the combination illustrated by the diagram 7$^a$, the current has four paths to ground, which are as follows:—Entering upon the plate 2, it passes as before described through the motors $c^2$ and $b^2$, returning to the plate 59, from thence to plate 56, to plate 20, by cross-connection to plate 4, through the resistance cylinder, to plate 12, thence by the cross-connection and plates 19, 28, and 43, to ground. A second circuit, starting from the plate 20, is by cross-connection to plate 39, to plate 97, to plate 95, through the motor $c'$, to plate 100, to plate 101, to plate 43, and to ground. Starting again from plate 20, the cross-connection to plate 39 gives connection to one of the terminals of the motor $b'$ by way of plate 91 and plate 94, and to one of the terminals of the motor $a^2$ by way of plate 62 and 60. Starting from the plate 12, after the current has passed through the resistance cylinder it goes by cross-connection to the plate 28, thence to plate 66, to plate 65, then to the other terminal of the motor $a^2$, which is thus in shunt between the two ground circuits. Dividing upon the plate 2, the current passes by cross connection to plate 30, thence to plate 71, to plate 69, through the motor $a'$, to plate 81, through the motor $b'$, to plate 94, to plate 91, to plate 39, to plate 97, to plate 95, through the motor $c'$, to plate 100, to plate 101, to plate 43, and to ground.

Passing now to the combination shown in the diagram 8$^a$, it will be observed that the brushes F$^2$ leading to the resistance cylinder by the leads F$^4$, F$^5$, will rest upon contact plates 3 and 11, and the resistance will therefore be open-circuited. The terminals of the motor $a^2$ will rest upon the plates 24—27 respectively, and this motor will therefore be also open-circuited. The current entering at plate 2 passes by cross-connection to plate 30, thence to plate 71, to plate 69, through the motor $a'$, to plate 81, through the motor $b'$, to plate 94, to plate 91, to plate 38, by cross-connection, to plate 43 and to ground. Starting again from plate 2 it passes as before described through motors $c^2$, $b^2$, to plate 59, to plate 56, then to plate 19, by cross-connections to plate 28, by cross-connection to plate 43, and to ground. One terminal of the motor $c'$ is also grounded through the plate 43, the motor itself being open-circuited, its other terminal resting upon plate 42. The combination as shown in the diagram Fig. 9$^a$ is the last running position, in which the motors are connected in three groups of two each. The resistance is shown connected in one of these lines, but it is to be understood that the revolution of the resistance cylinder eventually cuts out all resistance and balances the three circuits. In this position the highest speed of the motors is attained. All three of the circuits start from the plate 2, one proceeding by plates 47, 45 and 52, through the motors $c^2$, $b^2$ to plate 59, then to plate 56, to plate 19, by cross-connection to plate 28, by cross-connection to plate 43, and to ground. The second circuit proceeds also from plate 2, through the resistance cylinder, back to plate 10, by cross-connection to plate 23, to plate 62, to plate 60, through the motor $a^2$, to plate 65, to plate 66, to plate 26, by cross-connection to plate 41, to plate 97, to plate 95, through the motor $c'$, to plate 100, to plate 101, to plate 43, and to ground. Again starting from plate 2, the current passes by cross-connection to plate 30, then to plate 71, to plate 69, through the motor $a'$, to plate 81, through the motor $b'$, to plate 94, to plate 91, to plate 38, by cross-connection to 43, and to ground.

It is to be understood that the contact points $x$, $y$ illustrated in all of the diagrams are of use only when the cut-out cylinder is shifted to cut out one of the motors, and they are so placed that there will always be three motors shunted by the resistance in changing from the combination $3^a$ to $4^a$, the mate of the disabled motor being thrown to this position in order to cut it out gradually with the other two. By referring to Figs. 1 and 3 and comparing therein the shape of the return cam $I^4$ actuating the arm $I^6$, it will be seen that the revolution of the cut-out cylinder to the line $a\,a^2$, (in which position the motor $a^2$ is cut out directly, while its mate $a'$ is cut out by the commutating cylinder, as before explained,) is sufficient to bring the cam roller $I^7$ to a bearing upon the circular part of the cam $I^4$, and any further revolution of the cut-out cylinder has no effect upon the arm $I^6$. The stop-block $I^{10}$, Fig. 2, does not change its position by the revolution of the cut-out cylinder beyond the line $a\,a^2$. The illustrated position of the stop-block in Fig. 2 serves only to prevent the rotation of the commutating cylinder and its attached engine in a direction opposite to that of the arrow; while the depression of the block $I^{10}$ to its second position brings it into line with the stop $Z^5$, so that the commutating cylinder cannot be rotated in the direction of the arrow past the sixth position, or the position indicated by the diagram, Fig. $6^a$, which is the first multiple running position. In the ninth position the pin $I^{11}$ abuts upon the other face of the stop $Z^4$ and so arrests the engine.

It is manifest that with two of the motors cut out there is no difference between the positions Figs. $6^a$ and $9^a$ except the immaterial one of the resistance, which as heretofore explained, is designed to be cut out in the final running position.

In Figs. 16, 17, and 18 I show the stand and operating handle designed to control the movements of the various cylinders. In general, their action is usual and well-understood; but I provide them with an interlocking device which prevents the motion of the handle controlling the air engine rotating the commutating cylinder except at the times when the reversing cylinder is in one or the other of its two working positions.

As already pointed out, it is impossible to start the reversing cylinder except when the commutating cylinder is in its first or "off" position, and therefore the motion of each cylinder is so related to that of the other that a careless or ignorant attendant cannot short-circuit the dynamos on the reversing cylinder.

$G^6$, shown in Figs. 16 and 18, is the lever controlling the reversing cylinder, being connected to the rod $G^4$, and it is provided with a spring-bolt $G^7$, adapted to engage with one or the other of the notches $G^8$, $G^9$ in the sector $G^{12}$. Each of these notches corresponds to a running position of the reversing cylinder. Attached to the center of motion of the lever (by a key shown in dotted lines in Fig. 16) is a rock-shaft $G^{11}$, to the other end of which is secured a sector $G^{10}$, best shown in Fig. 17, which is also provided with two notches $G^{13}$, $G^{14}$, also corresponding, as presently explained, to the two running positions of the reversing cylinder. $U^{12}$ is a lever similar to $G^6$, but is connected to the commutating cylinder; that is to say, it controls the valve of the air-engine and the detent of the resistance-cylinder by means of the rod U, as already described in referring to Figs. 1 and 2. This lever is also provided with a spring-bolt $U^{14}$, engaging with the notch $U^{13}$ on the sector $U^{15}$. There is only one notch provided for this bolt, because so long as the lever $U^{12}$ is away from its middle position, the valve of the air-engine is open and the commutating cylinder rotates in one direction or the other, according to the position of the lever $U^{12}$. When the handle of this lever is moved to the right, the commutating cylinder is rotated toward its running positions, beginning at the lowest speed and progressing toward the highest. When it is moved toward the left, the motion is reversed.

The operation of the parts is as follows: When the reversing lever is midway of its traverse, as in the position shown in Fig. 18, the sector $G^{10}$ is also midway in its path of motion. It will then be impossible to move the lever $U^{12}$ toward the right, and current cannot be turned on by the commutating cylinder, which is in its "off" position. When the reversing lever $G^6$ is in one or the other of its running positions, as indicated by the notches $G^8$, $G^9$, one of the notches $G^{13}$, $G^{14}$ on the sector $G^{10}$ will be in alignment with the bottom part of the lever $U^{12}$, which may then be moved freely.

It will be observed that the locking-gear here described only operates to prevent the motion of the lever $U^{12}$ in one direction. The reason for this will be apparent by referring to Fig. 1, wherein it will be seen that the rod H, with its bent portion $H^4$, the pin $H^3$, the arm $G^3$, and notches $G'$, $G^2$, prevent the rotation of the reversing cylinder (and therefore the motion of the lever $G^6$) except when the commutating cylinder is in its "off" position, as already pointed out. The motion of the lever U¹² toward the left will therefore only tend to throw the commutating cylinder more strongly against its stop being also prevented by the pin I¹¹ abutting against the lug Z⁴: while its motion to the right would turn the commutating cylinder and throw on current, which it is imperative should be prevented. The pedal-arms T⁹, T¹⁰, T¹¹, operate the circuit-breaker, being connected to the rod T⁴. Shown in Figs. 1, 3 and 4. As already described, thrusting this rod up releases the detent armature M, allowing the spring Q to open the circuit, while pulling the rod down restores it by means of the bell-crank T². The middle arm T⁹ of the pedal is provided to permit the engineer to move the rod in the desired direction from either side of the controller. The pedal has a bearing upon, but is otherwise independent of, the rock shaft G¹¹.

Referring now to Fig. 19, I show a bell-crank connection which may be used to operate the rods. G¹² is the crank, shown connected at one end to the lever G⁶ by a short link G¹³, allowing the small amount of vertical play necessary, and at the other to the rod G⁴. A similar arrangement may be used for the other levers. It is manifest that any other form of connection may be employed, as a slotted link, an eccentric, or suitable gearing of any form, this being a mere mechanical feature.

Referring again to Fig. 16, when the lever G⁶ is midway of its motion, the motion of the lever U¹² toward the right is prevented by the abutting edge of the sector G¹⁰; but when permitted, will cause a downward motion of the rod U and a consequent upward movement of the valve V, which will admit air to the engine and drive the gear X in the direction of the arrow.

Referring now to Fig. 2, the downward motion of the rod U just referred to also carries the block I¹⁰ and the pin I¹¹ toward the left, by reason of the bearing of the pin I¹¹ in the slot U¹⁰ formed in the arm U² of the lever U, the block I¹⁰ sliding upon the lever arm I⁹. If now the air pressure is left on, the controller will run until the right face of the lug Z⁴ strikes the pin I¹¹ and forces it to its illustrated position, leaving the cylinders in their last running position. The lug Z⁴ bearing against the pin I¹¹ thus prevents a downward motion of the rod U, as the friction of the brushes on the cylinder is so great (the pressure required to transfer so large a current being considerable) that the operator could not move the lever U¹² hard enough to drive the gear X through the medium of the lever U'. The rod U, being pushed up, moves the valve and admits the air. The controller gear X now runs in an opposite direction until the other or left hand face of the lug Z⁴ strikes the pin I¹¹ and shuts off the controller, as explained above.

In Figs. 20 to 25 inclusive I show the possible positions of the motors as each one is cut out by the action of the cut-out cylinder. As already described, it is possible, after the cut-out cylinder is revolved to cut out a motor, to rotate the commutating cylinder only as far as its sixth position. The effect of this rotation is to combine the five remaining motors in a series position, but at the first multiple position to cut out the mate of the disabled motor leaving only four motors in action coupled in multiple groups of two in series. The effect of this arrangement is to give the engineer the benefit of the odd motor while getting up speed, at the same time preventing the circuits being thrown out of balance.

Figure 20:
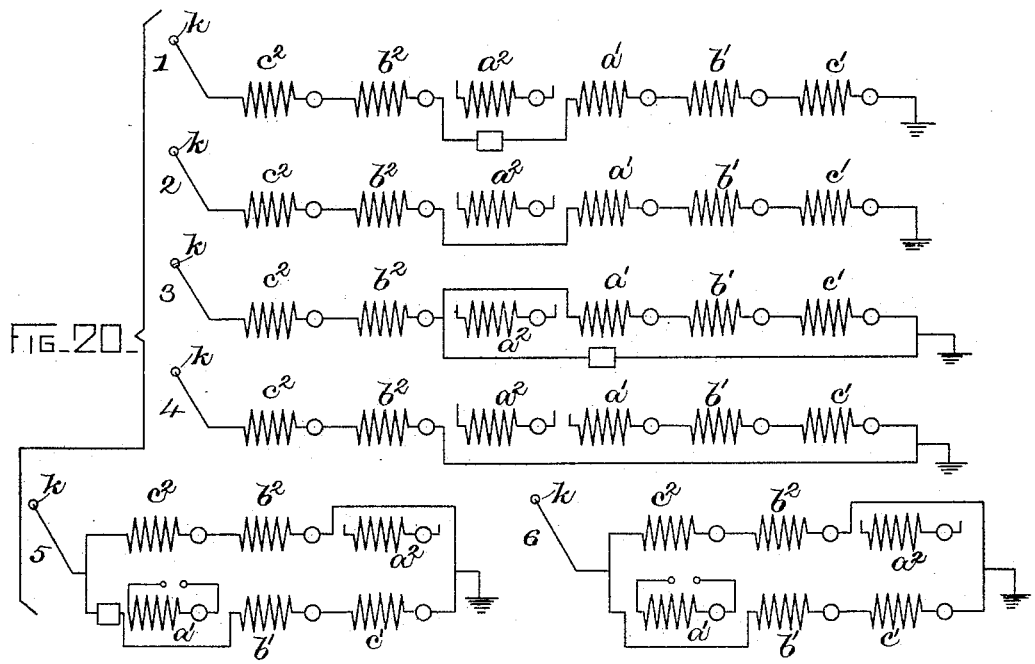

Referring now to Fig. 20, I show a series of positions in which the motor $a^2$ is cut out by the cut-out cylinder, in the latter positions the motor $a'$ being cut out also by the action of the commutating cylinder. In diagram 1, Fig. 20, the motor $a^2$ is cut out and the resistance is in series with the remaining motors. In diagram 2, the resistance is cut out. In diagram 3, motors $c^2$, $b^2$ are in series and motors $a'$, $b'$, $c'$ are in a second series, the resistance being in multiple with this second group of three and the resistance and the second group of three being in series with the first group of two. In diagram 4, the resistance is cut out and the group of three motors is open-circuited. In diagram 5, motors $c^2$, $b^2$, $b'$, $c'$, are in multiple in groups of two in series, the resistance being in series with the second group, while in diagram 6, which is the final running position, the resistance is cut out leaving the motors $a'$, $a^2$ cut out.

Figure 21:
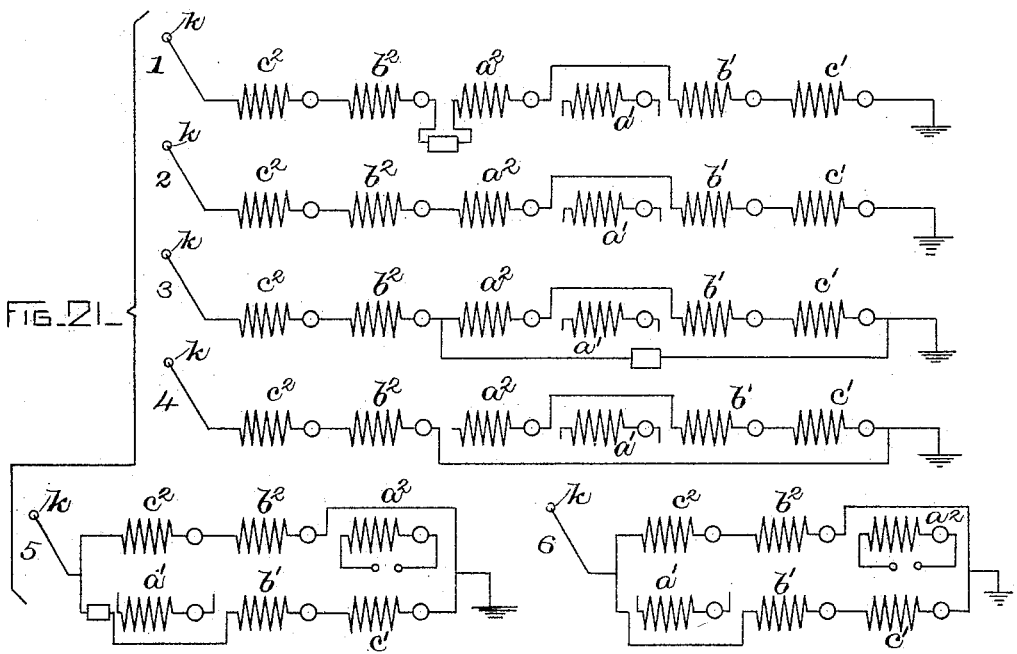

Referring now to Fig. 21, diagram 1 shows the motor $a'$ cut out and the resistance in series; diagram 2 the resistance cut out; diagram 3 the resistance in shunt around three of the motors and diagram 4 the resistance cut out and the three motors open-circuited, while diagrams 5 and 6 are identical with diagrams 5 and 6 in Fig. 20.

Referring to Fig. 22, the motor $b^2$ is shown cut out in the first diagram of the figure, with the resistance in series; in diagram 2 the resistance is cut out; in diagram 3 the resistance is in shunt around three of the motors; in diagram 4 the resistance is cut out and the three motors are open-circuited, and diagrams 5 and 6 correspond as before to diagrams 5 and 6 of Figs. 20 and 21.

Figure 24:
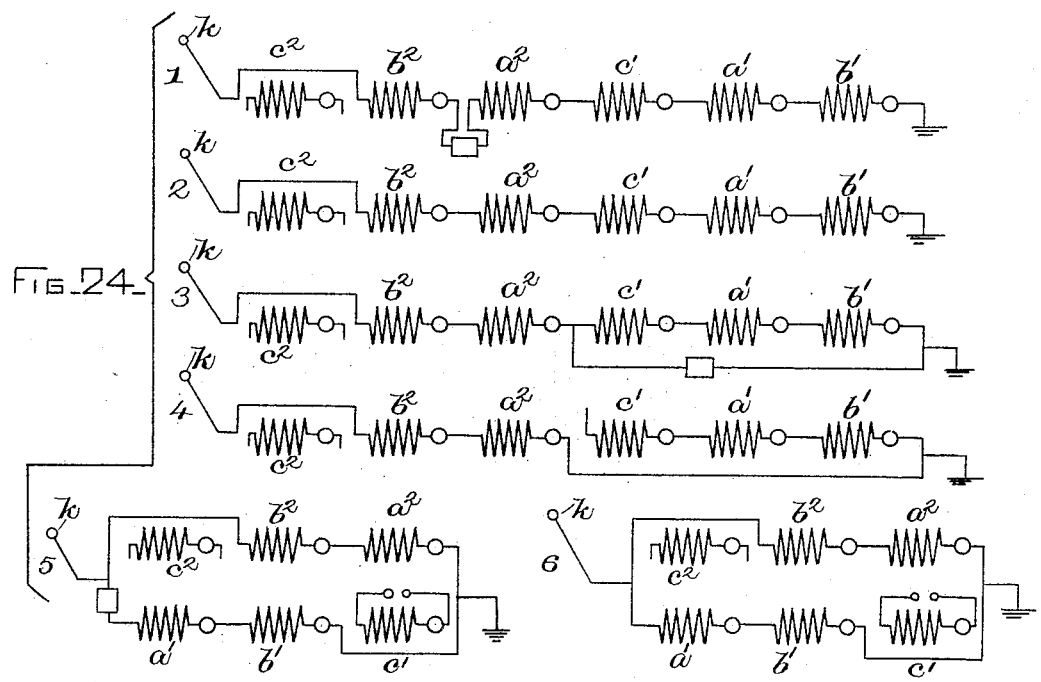
Figure 25:
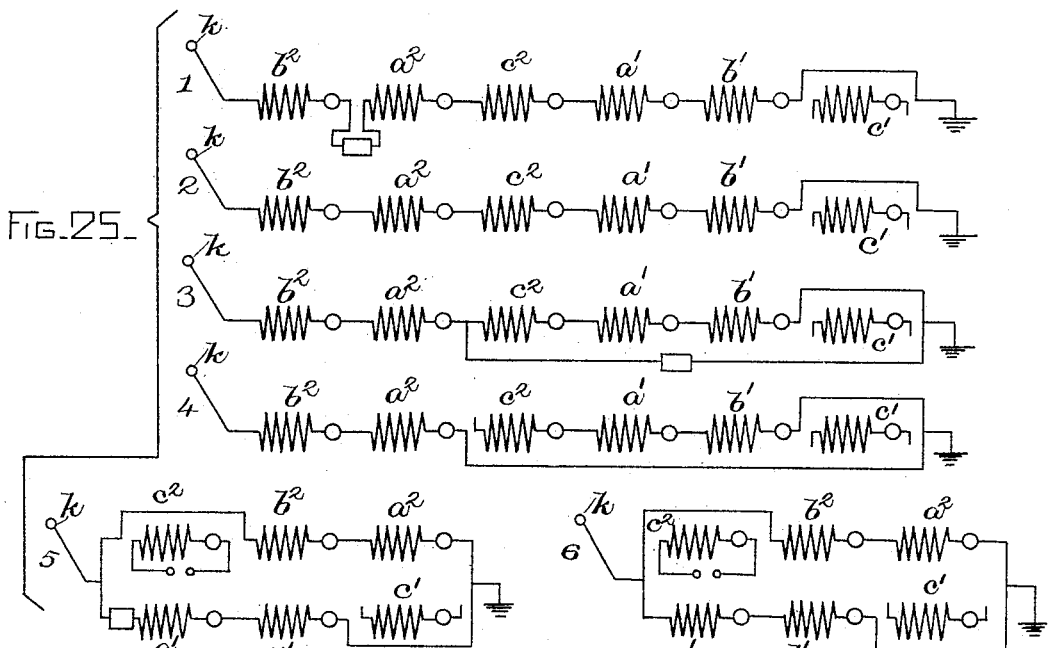

It is unnecessary to describe further Figs. 23, 24 and 25, as the series of diagrams in each figure is substantially identical with that in Fig. 20, except that in each case a different motor is shown cut out by the cut-out cylinder, the various steps being identical except that the units are different.

Having thus described my invention, what I claim as new, and desire to secure by Letters Patent of the United States, is—

1. A plurality of electric motors arranged in groups, a commutating cylinder adapted to connect them in series or multiple, and a cut-out cylinder arranged, substantially as described, to cut out any disabled motor from a group in all positions of the commutating cylinder and to cut out its mate only in multiple positions: whereby the power of the mate may be employed in the series positions, while the balance of the circuits is preserved in the multiple positions.

2. A plurality of electric motors arranged in groups, a commutating cylinder provided with contacts and cross connections adapted to connect the motors in series or multiple, and a cut-out cylinder provided with contacts and cross connections; all adapted and arranged substantially as herein described and set out to cut out a disabled motor from any group in all positions of the commutating cylinder and to cut out its mate only in multiple positions.

3. In a controlling apparatus for electric motors, an electro-magnetic circuit-breaker, a commutating cylinder and mechanism, substantially as described, operated thereby and adapted to vary the capacity of the circuit-breaker in accordance with the position of the commutating cylinder.

4. In a controlling apparatus for electric motors, an electro-magnetic circuit-breaker comprising a series coil, a core energized thereby, an armature attracted by such core and arranged to prevent the separation of the circuit-breaking contacts when not attracted, and a rotary yoke carried by the commutating cylinder and adapted to vary the attraction of the core upon the armature in accordance with the positions of the commutating cylinder.

5. In a controlling apparatus for electric motors, a commutating cylinder provided with contacts and cross-connections adapted to connect the motors in series or parallel, in combination with an electro-magnetic circuit-breaker comprising a series coil, a core energized thereby, an armature attracted by such core and adapted to hold in engagement the circuit-breaking contacts, and a rotary magnetic yoke attached to and revolving with the commutating cylinder; whereby the circuit breaker may have a different capacity for the series and multiple positions of the commutating cylinder.

6. In a controlling apparatus for electric motors, an electro-magnetic circuit-breaker, a cut-out cylinder, and mechanism, substantially as described, operated thereby and adapted to vary the capacity of the circuit-breaker in accordance with the position of the cut-out cylinder.

7. In a controller for electric motors, an electro-magnetic circuit-breaker, a cut-out cylinder and adjustable mechanism, substantially as described, operated thereby and adapted to vary the capacity of the circuit-breaker in accordance with the position of the cut-out cylinder.

8. In a controller for electric motors, an electro-magnetic circuit breaker comprising a series coil, a core magnetized thereby, an armature attracted by such core against the pull of a spring, and contacts arranged to separate when the armature is thus attracted; in combination with a cut-out cylinder, and mechanism adapted to increase the tension of the spring when any motor is cut out by the revolution of the cut-out cylinder.

9. In a controller for electric motors, an electro-magnetic circuit-breaker comprising a series coil, a core magnetized thereby, an armature attracted by such core against the pull of a spring and arranged to hold in engagement the contacts of the circuit-breaker; in combination with a cut-out cylinder, a cam attached to and revolving therewith, an arm operated by such cam and arranged to furnish an adjustable bearing for the spring; whereby the revolution of the cut-out cylinder may increase the tension of the spring to vary the capacity of the circuit-breaker when a motor is cut out.

10. In a controller for electric motors, an electro-magnetic circuit-breaker comprising a series coil, a core magnetized thereby, an armature attracted by such core against the pull of a spring and contacts held in engagement when the armature is unattracted; in combination with a cut-out cylinder, a cam attached to and revolving therewith, an arm operated by such cam and adapted to form a bearing for one end of the spring; whereby the revolution of the cut-out cylinder may increase the tension of the spring to vary the capacity of the circuit-breaker when a motor is cut out.

11. In a controller for electric motors, an electro-magnetic circuit-breaker comprising a series coil, a core magnetized thereby, an armature attracted by such core against the pull of a spring, circuit-breaking contacts comprising a main and an auxiliary contact upon the same rod, and a detent upon the armature holding such contacts in engagement; all in combination with a rotary magnetic yoke attached to and revolving with the commutating cylinder and adapted to vary the pull upon the armature in accordance with the position of the commutating cylinder.

12. In a controller for electric motors, an electro-magnetic circuit-breaker comprising a series coil, a core for such series coil provided with a pole piece, a second core also provided with a pole piece, and a magnetic yoke arranged to complete the circuit between the pole pieces and to be maintained at different distances therefrom, and an armature attracted by the second core and adapted to act as a detent for the circuit breaking contacts.

13. In a controller for electric motors, a commutating cylinder adapted to connect the motors in series or parallel at will, a reversing cylinder, and mechanism adapted to release such reversing cylinder only when the commutating cylinder is in its first or off position.

14. In a controller for electric motors, a commutating cylinder, a reversing cylinder and a detent for such reversing cylinder arranged to be thrown out of engagement by the rotation of the commutating cylinder to its first or off position.

15. In a controller for electric motors, a reversing cylinder provided with detent notches, as $G'$, $G^2$, a detent lever, as $G^3$, adapted to maintain the cylinder in one or the other of two positions, a rod, as H, attached to the detent lever and adapted to co-operate with a pin, as $H^3$, rotated by the commutating cylinder and arranged to lift the detent lever $G^3$ from the notches only when the commutating cylinder is in its "off" position.

16. In a controller for electric motors, a commutating cylinder adapted to connect the motors in series or multiple, a resistance cylinder geared thereto arranged to cut in or out successive sections of resistance, and mechanism adapted to release both cylinders or lock them in position, substantially as described.

17. In a controller for electric motors, a commutating cylinder adapted to connect the motors in series or parallel at will, a cut-out cylinder, and mechanism adapted to be operated by the cut-out cylinder and arranged to stop the commutating cylinder at a definite point in its revolution.

18. In a controller for electric motors, a commutating cylinder actuated by fluid pressure, a resistance cylinder geared to and operated by the revolution of the commutating cylinder, a stop adapted to control the revolution of the commutating cylinder, a valve adapted to control the fluid pressure and a second stop arranged to lock the resistance cylinder, the two stops and the valve being connected; whereby they may be simultaneously actuated to permit or stop the rotation of the two cylinders.

19. In a controller for electric motors, a commutating cylinder actuated by fluid pressure, a resistance cylinder geared thereto, and interlocking mechanism adapted to simultaneously control the fluid pressure and release or lock the cylinders.

20. In a controller for electric motors, a commutating cylinder, a resistance cylinder geared thereto, and interlocking mechanism adapted to permit a partial rotation of the commutating cylinder in its series position and arranged to arrest the motion of the resistance cylinder at definite points at will, and thus vary the amount of resistance in circuit in the series position of the commutating cylinder.

21. In a controller for electric motors, a cut-out cylinder, a stop actuated thereby, a commutating cylinder provided with notches co-operating with such stop and adapted to prevent the rotation of the commutating cylinder to multiple position when the cut-out cylinder is rotated to cut out a motor.

22. In a controller for electric motors, a commutating cylinder, provided with notches, as $Z^4$, $Z^5$, adapted to co-operate with a stop, as $I^{10}$, a cut-out cylinder provided with a return-cam, as $I^4$, and lever arms, as $I^6$, $I^9$, adapted to actuate the stop $I^{10}$ by the rotation of the cut-out cylinder, substantially as described.

23. In a controller for electric motors, a commutating cylinder, provided with stops, as $Z^4$, $Z^5$, adapted to co-operate with a stop, as $I^{10}$, a cut-out cylinder provided with a cam, as $I^4$, and lever arms, as $I^6$, $I^9$, a gear, as $I^3$, attached to the cut-out cylinder, and a worm, as $I^2$, co-operating with the gear to rotate the cut-out cylinder; all arranged and adapted as herein set out to stop the rotation of the commutating cylinder before reaching the multiple positions, when a motor is cut out while permitting its rotation in the series positions.

24. In a controller for electric motors, a commutating cylinder provided with a flange, a manually controlled stop adapted to move upon either side thereof, and cut away portions in such flange adapted to engage the stop and arrest the rotation of the cylinder.

25. In a controller for electric motors, a commutating cylinder provided with a flange having cut away portions, as $Z^2$, $Z^3$, adapted to engage a stop, as $U^5$, and thus arrest the rotation of the cylinder, and a longer cut away portion, as $Z^6$, with which the stop may engage without arresting the cylinder, a resistance cylinder geared to the commutating cylinder and revolving therewith, such resistance cylinder having detent notches, as W, and a stop as $U^7$, connected to and operated simultaneously with the stop $U^5$; whereby the commutating cylinder may revolve in its series positions to vary the amount of resistance in circuit.

26. A cylindrical switch for electric apparatus, provided upon the interior of its cylinder with blow out magnets adapted to extinguish any arc that may be formed at the contacts upon the surface of the cylinder, substantially as described herein.

27. In a controller for electric motors, a resistance cylinder provided with interior blow-out magnets, one of such magnets being wound with heavier coils than the others and arranged beneath the brushes which first break contact, substantially as described.

28. In a controller for electric motors, a resistance cylinder having its contact brushes divided into a main and an auxiliary group, the brushes of the auxiliary group being arranged to break contact before those in the main group.

29. In a controller for electric motors, a resistance cylinder having its contact-brushes divided into a main and an auxiliary group, the brushes of the auxiliary group arranged to break contact before those in the main group, provided with blow-out magnets therein, and an auxiliary blow-out magnet of greater strength beneath the brushes of the auxiliary group.

30. The method of changing six motors from series to parallel groups of three in series, which consists in forming a shunt connection between the terminal of the third motor and ground, including a resistance, then open-circuiting the second group of three and cutting out the resistance, then connecting the open-circuited group in shunt around the first group, the shunt including a resistance, and then cutting out the resistance, leaving the two groups in parallel.

31. The method of changing six motors from two parallel groups of three in series to three parallel groups of two in series, which consists in putting the first two motors in a circuit to ground which includes a resistance, the second two motors in a shunt around the first two motors and the resistance to the terminal of the fifth motor, making a shunt connection between the ground-terminals of the first group of two and the second group of two, putting the sixth motor in shunt between such shunt connection and the ground lead of the resistance, then open circuiting the fifth and sixth motors and connecting the terminal of the second group of two to ground and cutting out the resistance, then connecting the fifth and sixth motors between the resistance and ground and connecting the resistance to the lead to the second group of motors and finally cutting out the resistance, leaving the motors in three parallel groups of two in series.

32. In a controller for electric motors, a commutating cylinder, a reversing cylinder, and mechanism adapted to permit the starting of the commutating cylinder only when the reversing cylinder is in a running position.

33. In a controller for electric motors, a commutating cylinder, a reversing cylinder, and means arranged to interlock the two cylinders; all as herein described, whereby the commutating cylinder may be started only when the reversing cylinder is in a running position, and the reversing cylinder may be rotated only when the commutating cylinder is in its "off" position.

34. In combination, commutating mechanism adapted to connect electric motors in series or parallel, reversing mechanism for such motors, an operating lever for the commutating mechanism, a second operating lever having two running positions for the reversing mechanism, and interlocking devices arranged to permit the action of the operating lever for the commutating mechanism only when the lever of the reversing mechanism is in one or the other of its running positions.

35. In combination, commutating mechanism adapted to connect electric motors in series or parallel, reversing mechanism for such motors, an operating lever for the commutating mechanism, a second operating lever having two running positions, and a sector provided with two notches corresponding to the running positions of the reversing lever and adapted to prevent the motion of the commutating lever except when opposite one of such notches, such sector being connected to and moving with the reversing lever.

36. The method of changing five motors from series to two groups in multiple of two in series, by cutting out the fifth motor, which consists of making a shunt around three of such motors, the shunt including a resistance, then cutting out the resistance and open-circuiting the group of three, then cutting out the odd motor and including the resistance, while connecting the motors into two groups in multiple of two in series, and then cutting out the resistance.

In witness whereof I have hereunto set my hand this 14th day of November, 1893.

JOHN W. DARLEY, Jr.

Witnesses:
WM. E. MESSERSMITH,
A. WAGNER.